(12) United States Patent

Herrera Covarrubias et al.

(10) Patent No.: US 12,649,433 B1

(45) Date of Patent: Jun. 9, 2026

(54) HYBRID BRACKET FOR A VEHICLE

(71) Applicant: Ford Global Technologies, LLC, Dearborn, MI (US)

(72) Inventors: Lemuel Enrique Herrera Covarrubias, Mexico City (MX); Rodolfo Carmona Cruz, Naucalpan de Juárez (MX); Javier Mauricio Magana Pérez, Mexico City (MX); Adrian Molina Hernández, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/251,027

(22) Filed: Jun. 26, 2025

(51) Int. Cl.
B60R 21/213 (2011.01)
B60R 21/232 (2011.01)

(52) U.S. Cl.
CPC .......... B60R 21/213 (2013.01); B60R 21/232 (2013.01)

(58) Field of Classification Search
CPC ............................. B60R 21/213; B60R 21/232
See application file for complete search history.

(56) References Cited

U.S. PATENT DOCUMENTS

| | | | |
|---|---|---|---|
| 6,485,048 B2 | 11/2002 | Tajima et al. | |
| 7,188,863 B2 | 3/2007 | Tiesler et al. | |
| 7,735,854 B2 | 6/2010 | Chang | |
| 8,096,574 B2 | 1/2012 | Okimoto et al. | |
| 8,596,672 B2 * | 12/2013 | Sugiyama | B60R 21/213 |
| | | | 280/730.2 |

| | | | |
|---|---|---|---|
| 8,833,797 B2 * | 9/2014 | Suga | B60R 21/213 |
| | | | 280/730.2 |
| 9,539,976 B2 * | 1/2017 | Jinnai | B60R 21/237 |
| 10,300,879 B2 * | 5/2019 | Hirayama | B60R 21/232 |
| 10,399,532 B2 | 9/2019 | Ma et al. | |
| 10,661,745 B2 * | 5/2020 | Kakimoto | B60R 21/2334 |
| 10,933,832 B2 * | 3/2021 | Kakimoto | B60R 21/237 |
| 11,007,966 B2 * | 5/2021 | Kakimoto | B60R 21/213 |
| 11,072,303 B2 * | 7/2021 | Ono | B60R 13/025 |
| 11,117,627 B2 | 9/2021 | Pleet et al. | |

(Continued)

FOREIGN PATENT DOCUMENTS

DE 102014017531 A1 * 6/2015 ........... B60R 21/213

OTHER PUBLICATIONS

DE-102014017531-A1 (machine translation) (Year: 2015).*

*Primary Examiner* — Jason D Shanske

*Assistant Examiner* — Joselynn Y Sliteris

(74) *Attorney, Agent, or Firm* — Vichit Chea; Price Heneveld LLP

(57) ABSTRACT

A hybrid bracket for a vehicle is configured to facilitate attachment of various vehicle components to the body of a vehicle while simultaneously providing various other functionalities. The hybrid bracket can facilitate the attachment of a wire harness, an air curtain, a headliner, and various vehicle trim pieces to the body of the vehicle. The hybrid bracket can additionally be configured to function in an energy absorptive capacity in response to a force exerted against the hybrid bracket. To provide these various functionalities, the hybrid bracket can be substantially formed of a polymeric material that is coupled with a plurality of metallic inserts that are configured to facilitate the attachment of the air curtain to the hybrid bracket via an insert molding process.

20 Claims, 15 Drawing Sheets

(56)    References Cited

U.S. PATENT DOCUMENTS

| 12,312,007 | B2 * | 5/2025 | Freeman | ................ B62D 25/04 |
| 2008/0197610 | A1 | 8/2008 | Downey | |
| 2018/0345897 | A1 | 12/2018 | Villacres Mesias et al. | |
| 2024/0043067 | A1 | 2/2024 | Freeman et al. | |
| 2024/0227715 | A1 | 7/2024 | Tilli et al. | |
| 2025/0001955 | A1 * | 1/2025 | Urano | ................... B60R 21/213 |
| 2025/0296525 | A1 * | 9/2025 | Kato | ..................... B60R 21/232 |
| 2026/0014955 | A1 * | 1/2026 | Kato | ..................... B60R 21/214 |

* cited by examiner

HYBRID BRACKET FOR A VEHICLE

FIELD OF THE DISCLOSURE

The present disclosure generally relates to a bracket for a vehicle, wherein the bracket is configured to provide a variety of functionalities.

BACKGROUND OF THE DISCLOSURE

A variety of brackets exist to couple trim components of a vehicle to a body of the vehicle. Such brackets may be configured to perform a variety of other functionalities while simultaneously providing a platform upon which various vehicle components can mount.

SUMMARY OF THE DISCLOSURE

According to a first aspect of the present disclosure, a hybrid bracket for a vehicle comprises a front-pillar section configured to couple with a front-pillar of a vehicle, and a middle-pillar section that extends from the front-pillar section and that is configured to couple with a middle-pillar of the vehicle, wherein the middle-pillar section has a substantially convex shape and forms an air curtain ramp configured to direct the deployment of an air curtain coupled with the hybrid bracket, and wherein the middle-pillar section is configured to extend towards a center plane of the vehicle when the hybrid bracket is coupled to the vehicle.

Embodiments of the first aspect of the present disclosure can include any one or a combination of the following features:

The air curtain ramp can be formed of a series of ribs interspaced by a plurality of slots;

The air curtain ramp can be configured to deform under an exerted force;

The air curtain ramp can be configured to align with the middle-pillar of the vehicle;

The front-pillar section of the hybrid bracket can form a double attachment protrusion that extends towards the center plane of the vehicle when the hybrid bracket is coupled to the vehicle, and a triple attachment protrusion that extends towards the center plane of the vehicle when the hybrid bracket is coupled with the vehicle;

The double attachment protrusion can comprise a fore section that extends towards the center plane of the vehicle for a first distance when the hybrid bracket is coupled with the vehicle, and an aft section that extends towards the center plane of the vehicle for a second distance when the hybrid bracket is coupled with the vehicle, wherein the second distance is greater than the first distance;

The triple attachment protrusion can comprise a front section that extends towards the center plane of the vehicle for a third distance when the hybrid bracket is coupled with the vehicle, a middle section that extends towards the center plane of the vehicle for a fourth distance when the hybrid bracket is coupled with the vehicle, and a rear section that extends towards the center plane of the vehicle for a fifth distance when the hybrid bracket is coupled with the vehicle, wherein the fifth distance is greater than the fourth distance, and wherein the fourth distance is greater than the third distance;

The double attachment protrusion and the triple attachment protrusion can be configured to at least partially support a wire harness of the vehicle;

The aft section of the double attachment protrusion can be configured to couple with a front-pillar trim piece;

The rear section of the triple attachment protrusion can be configured to couple with a headliner of the vehicle;

The hybrid bracket can be formed substantially of a polymeric material; and

The hybrid bracket can have a plurality of inserts that are each formed substantially of metal, wherein the plurality of inserts facilitates the attachment of the air curtain to the hybrid bracket.

According to a second aspect of the present disclosure, a hybrid bracket for a vehicle comprises a front-pillar section configured to couple with a front-pillar of a vehicle, a middle-pillar section that extends from the front-pillar section, wherein the middle-pillar section is configured to couple with a middle-pillar of the vehicle, and a plurality of inserts that are each formed substantially of metal, wherein the plurality of inserts facilitate the attachment of an air curtain to the hybrid bracket.

Embodiments of the second aspect of the present disclosure can include any one or a combination of the following features:

The front-pillar section and the middle-pillar section can each be formed substantially of a polymeric material;

The hybrid bracket can be formed via an insert molding process;

The plurality of inserts can include a first insert coupled with the front-pillar section, a second insert coupled with the middle-pillar section, and a third insert coupled with the middle-pillar section; and The hybrid bracket can have a double attachment protrusion that extends from the front-pillar section towards a center plane of the vehicle when the hybrid bracket is coupled with the vehicle, and a triple attachment protrusion that extends from the front-pillar section towards the center plane of the vehicle when the hybrid bracket is coupled with the vehicle, wherein the first insert is interposed between the double attachment protrusion and the triple attachment protrusion.

According to a third aspect of the present disclosure, a vehicle comprises a hybrid bracket coupled with the vehicle, wherein the hybrid bracket comprises a front-pillar section coupled with a front-pillar of the vehicle, and a middle-pillar section that extends from the front-pillar section and that is coupled with a middle-pillar of the vehicle, wherein the middle-pillar section has a substantially convex shape and forms an air curtain ramp configured to direct the deployment of an air curtain coupled with the hybrid bracket, and wherein the middle-pillar section extends towards a center plane of the vehicle.

Embodiments of the third aspect of the present disclosure can include any one or a combination of the following features:

The hybrid bracket can have a plurality of inserts that are each formed substantially of metal, wherein the air curtain is coupled to the plurality of inserts; and The plurality of inserts can include a first insert coupled with the front-pillar section, a second insert coupled with the middle-pillar section, and a third insert coupled with the middle-pillar section, wherein the air curtain ramp is interposed between the second insert and the third insert.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
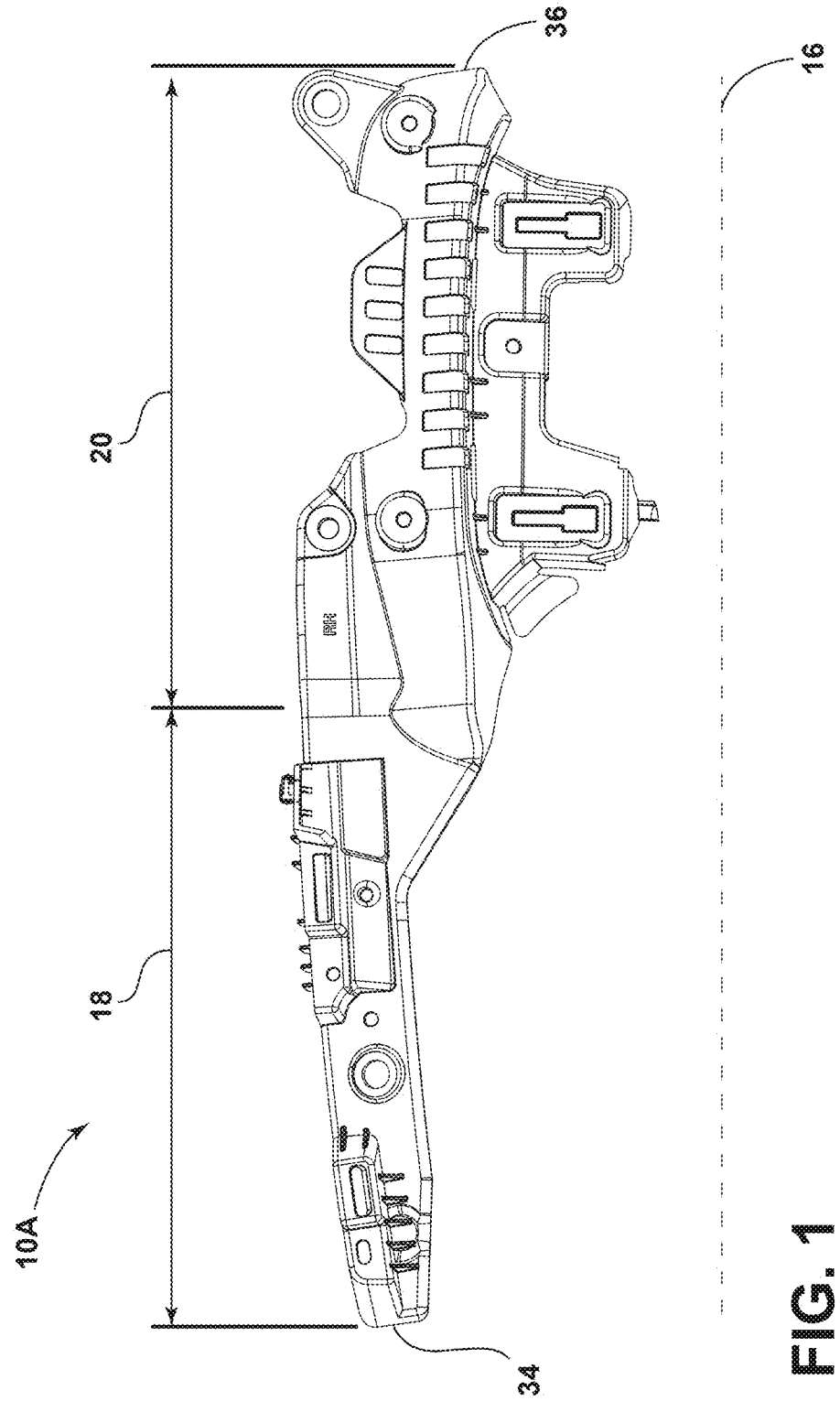
FIG. 1 is a side elevational view of a hybrid bracket configured to couple with a passenger side of a body of a vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a hybrid bracket for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-15, a hybrid bracket 10A, 10B configured to attach to a body 12 of a vehicle 14 is provided. The vehicle 14 is shown in FIG. 15 divided into two equivalent halves by a center plane 28. The center plane 28 extends in the fore-aft direction along the length of the vehicle 14 substantially parallel to a longitudinal axis 16 of the vehicle 14 to define a passenger side 11 of the vehicle 14 on one side of the center plane 28 and a driver side 15 on the other side of the center plane 28. A hybrid bracket 10A can be attached to the passenger side 11 of the vehicle 14, and a hybrid bracket 10B can be attached to the driver side 15 of the vehicle 14. Both hybrid brackets 10A, 10B are substantially the same in form, components, and dimensions, but are configured to attach to different sides of the body 12 of the vehicle 14. Throughout the description below, the hybrid bracket 10A attached to the passenger side 11 will be described. The description of the hybrid bracket 10A is applicable to the hybrid bracket 10B, except where otherwise noted. Likewise, the description of the hybrid bracket 10B is applicable to the hybrid bracket 10A, except where otherwise noted.

With particular reference to FIG. 15, the hybrid bracket 10A forms a generally elongate form that extends substantially parallel with the longitudinal axis 16 of the vehicle 14. The hybrid bracket 10A is formed of a front-pillar section 18 and a middle-pillar section 20 and is configured to attach to and extend between a front-pillar 22 of the body 12 and a middle-pillar 24 of the body 12. The body 12 of the vehicle 14 generally provides the structural frame of the vehicle 14 and can include, among other pillars, the front pillar 22 and the middle pillar 24. The hybrid bracket 10A provides a variety of attachment features configured to interact with a variety of vehicle components to facilitate the attachment of the variety of vehicle components to the body 12 of the vehicle 14 via the hybrid bracket 10A. Additionally, the middle-pillar section 20 of the hybrid bracket 10A can form a substantially convex shape defining an air curtain ramp 30 that is configured to direct the deployment of an air curtain 32 of the vehicle 14. Further, the air curtain ramp 30 can be formed of a first series of ribs 102 interspaced by a first plurality of slots 104, allowing the air curtain ramp 30 to deform under an exerted force. Accordingly, the hybrid bracket 10A provides a variety of functionalities when attached to the body 12 of the vehicle 14, both allowing for the reduction of part count, casing manufacturing, and reducing the space required to provide the various functionalities.

Referring now to FIG. 1, the hybrid bracket 10A is formed of both the front-pillar section 18 and the middle-pillar section 20. The hybrid bracket 10A may be integrally formed as a single, unitary body. As such, the front-pillar section 18 and the middle-pillar section 20 may be integral to one another. The front-pillar section 18 and the middle-pillar section 20 extend from one another substantially parallel with the longitudinal axis 16 of the vehicle 14. As such, the hybrid bracket 10A is provided with a substantially elongated shape with a front end 34 defined by the front-pillar section 18 and a rear end 36 defined by the middle-pillar section 20. Consequently, the hybrid bracket 10A can attach to both the front-pillar 22 and the middle-pillar 24 of the body 12 of the vehicle 14, as shown best in FIGS. 8 and 15.

Figure 2:
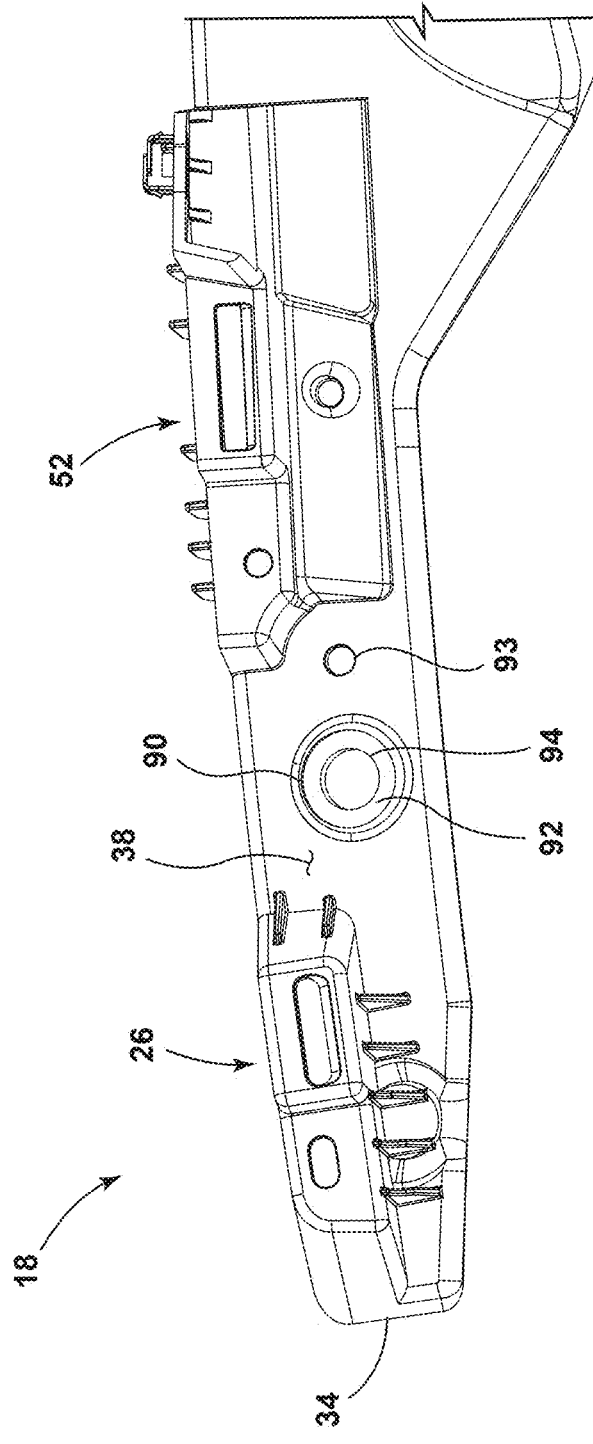
FIG. 2 is a bottom perspective view of a front-pillar section of the hybrid bracket.

Referring now to FIG. 2, the front-pillar section 18 is the portion of the hybrid bracket 10A configured to couple with, or otherwise attach to, the front-pillar 22 of the body 12 of the vehicle 14. Accordingly, the front-pillar section 18 can be the portion of the hybrid bracket 10A that is proximate to the front of the vehicle 14 when the hybrid bracket 10A is attached to the body 12 of the vehicle 14. The front-pillar section 18 can additionally be formed such that the shape and dimensions of the front-pillar section 18 align with, or otherwise substantially conform to the front-pillar 22, as shown best in FIG. 8. Consequently, the front-pillar section 18 can be positioned substantially flush with the front-pillar 22.

With continued reference to FIG. 2, the front-pillar section 18 can form a double attachment protrusion 26 that extends outwards from the front-pillar section 18. When the hybrid bracket 10A is attached to the body 12, the double attachment protrusion 26 can extend towards the center plane 28 of the vehicle 14. Specifically, the double attachment protrusion 26 can extend substantially perpendicular to a front-pillar section exterior surface 38 of the front-pillar section 18 towards the center plane 28 when the hybrid bracket 10A is coupled with the body 12. Additionally, the double attachment protrusion 26 can be positioned adjacent to the front end 34 of the hybrid bracket 10A. The double attachment protrusion 26 can be integral with the front-pillar section 18, forming a hollow interior, and defining a generally rectangular shape.

Figure 3:
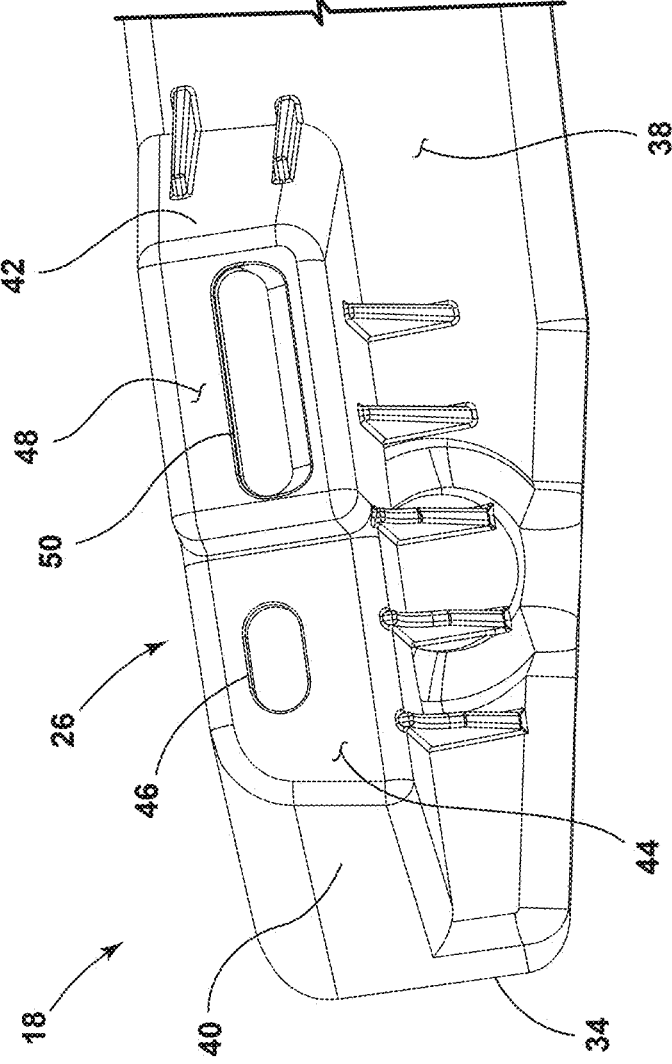
FIG. 3 is a bottom perspective view of a double attachment protrusion of the front-pillar section of the hybrid bracket.

With reference now to FIG. 3, the double attachment protrusion 26 is formed of a fore section 40 and an aft section 42. The fore section 40 of the double attachment protrusion 26 is positioned proximal to the front end 34 of the hybrid bracket 10A relative to the aft section 42. Both the fore section 40 and the aft section 42 can define a substantially similar rectangular shape. The fore section 40 extends outwards from the front-pillar section exterior surface 38. When the hybrid bracket 10A is attached to the body 12, the fore section 40 can extend towards the center plane 28 of the vehicle 14 for a first distance. Likewise, the aft section 42 extends outwards from the front-pillar section exterior surface 38. When the hybrid bracket 10A is attached to the body 12, the aft section 42 can extend towards the center plane 28 of the vehicle 14 for a second distance. The second distance can be greater than the first distance, such that the aft section 42 extends outwards from the front-pillar section exterior surface 38 further than the fore section 40. In other words, the aft section 42 is positioned closer to the center plane 28 than the fore section 40 when the hybrid bracket 10A is attached to the body 12.

With continued reference to FIG. 3, the fore section 40 can form an outer fore surface 44. The outer fore surface 44 can be the distal-most surface of the fore section 40 relative to the front-pillar section exterior surface 38. The outer fore surface 44 can be a substantially planar surface. A fore section aperture 46 can be defined by the fore section 40. Specifically, the fore section aperture 46 can be defined by the outer fore surface 44 to form a passage therethrough to the hollow interior of the double attachment protrusion 26. As such, the fore section aperture 46 can be positioned at the distal-most portion of the fore section 40 relative to the front-pillar section exterior surface 38. The fore section aperture 46 is configured to receive, or otherwise accept, a connector, fastener, or other connective structure, provided by a vehicle component to couple the vehicle component to the hybrid bracket 10A via the double attachment protrusion 26.

With continued reference to FIG. 3, the aft section 42 can form an outer aft surface 48. The outer aft surface 48 can be the distal-most surface of the aft section 42 relative to the front-pillar section exterior surface 38. The outer aft surface 48 can be a substantially planar surface and can be positioned further from the front-pillar section exterior surface 38 than the outer fore surface 44. An aft section aperture 50 can be defined by the aft section 42. Specifically, the aft section aperture 50 can be defined by the outer aft surface 48 to form a passage therethrough to the hollow interior of the double attachment protrusion 26. As such, the aft section aperture 50 can be positioned at the distal-most portion of the aft section 42 relative to the front-pillar section exterior surface 38. The aft section aperture 50 is configured to receive, or otherwise accept, a connector, fastener, or other connective structure, provided by a vehicle component to couple the vehicle component to the hybrid bracket 10A via the double attachment protrusion 26.

With reference back to FIG. 2, the front-pillar section 18 can form a triple attachment protrusion 52 that extends outwards from the front-pillar section 18. When the hybrid bracket 10A is attached to the body 12, the triple attachment protrusion 52 can extend towards the center plane 28 of the vehicle 14. Specifically, similar to the double attachment protrusion 26, the triple attachment protrusion 52 can extend substantially perpendicular to the front-pillar section exterior surface 38. Additionally, the triple attachment protrusion 52 can be longitudinally spaced from the double attachment protrusion 26. Specifically, the triple attachment protrusion 52 can be positioned closer to the middle-pillar section 20 than the double attachment protrusion 26 and further from the front end 34 than the double attachment protrusion 26. The triple attachment protrusion 52 can be integral with the front-pillar section 18, forming a hollow interior, and defining a generally rectangular shape.

Figure 4:
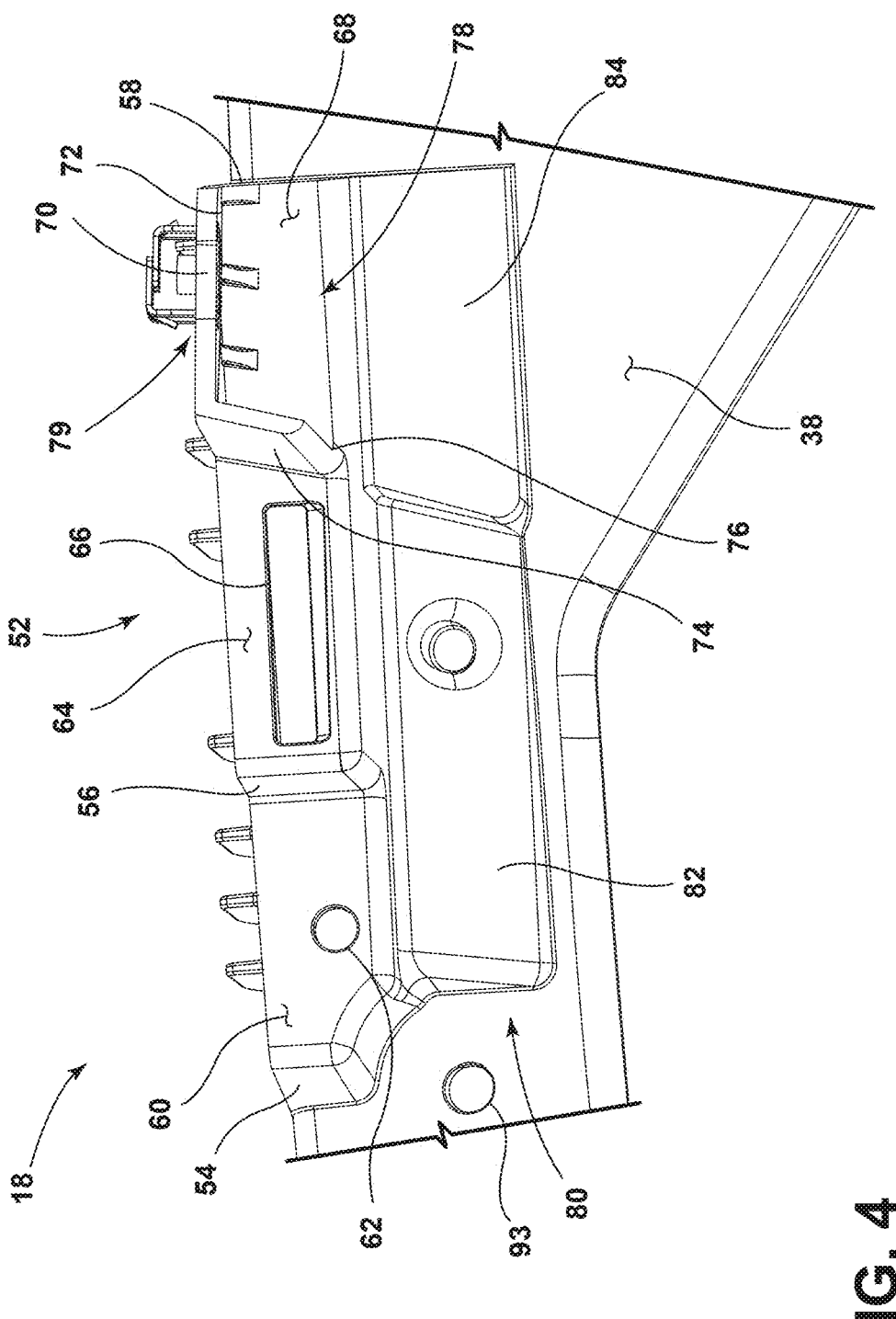
FIG. 4 is a bottom perspective view of a triple attachment protrusion of the front-pillar section of the hybrid bracket.

With reference now to FIG. 4, the triple attachment protrusion 52 is formed of a front section 54, a middle section 56, a rear section 58 and an attachment plate 80. The front section 54, the middle section 56, and the rear section 58 each extend outwards from the front-pillar section exterior surface 38 towards the center plane 28 of the vehicle 14 when the hybrid bracket 10A is coupled to the body 12. The front section 54 can extend towards the center plane 28 of the vehicle 14 for a third distance. The middle section 56 can extend towards the center plane 28 of the vehicle 14 for a fourth distance. The rear section 58 can extend towards the center plane 28 of the vehicle 14 for a fifth distance. The fifth distance can be greater than the fourth distance, and the fourth distance can be greater than the third distance. Accordingly, the rear section 58 is the section of the triple attachment protrusion 52 that extends the furthest from the front-pillar section exterior surface 38 and can be positioned closest to the center plane 28 of the vehicle 14 when the hybrid bracket is attached to the body 12.

As shown in FIG. 4, the front section 54 can be positioned closer to the front end 34 of the hybrid bracket 10A than the rear section 58 and the middle section 56 can be interposed between the front section 54 and the rear section 58.

With continued reference to FIG. 4, the front section 54 of the triple attachment protrusion 52 can form an outer front section surface 60. The outer front section surface 60 can be the distal-most surface of the front section 54 relative to the front-pillar section exterior surface 38. The outer front section surface 60 can be a substantially planar surface. A front section aperture 62 can be defined by the front section 54. Specifically, the front section aperture 62 can be defined by the outer front section surface 60 to form a passage therethrough to the hollow interior of the triple attachment protrusion 52. As such, the front section aperture 62 can be positioned at the distal-most portion of the front section 54 relative to the front-pillar section exterior surface 38, and consequently, the hybrid bracket 10A. The front section aperture 62 is configured to receive, or otherwise accept, a connector, fastener, or other connective structure, provided by a vehicle component to couple the vehicle component to the hybrid bracket 10A via the triple attachment protrusion 52.

With continued reference to FIG. 4, the middle section 56 can form an outer middle section surface 64. The outer middle section surface 64 can be the distal-most surface of the middle section 56 relative to the front-pillar section exterior surface 38. The outer middle section surface 64 can be a substantially planar surface and can be positioned further from the front-pillar section exterior surface 38 than the outer front section surface 60. A middle section aperture 66 can be defined by the middle section 56. Specifically, the middle section aperture 66 can be defined by the outer middle section surface 64 to form a passage therethrough to the hollow interior of the triple attachment protrusion 52. As such, the middle section aperture 66 can be positioned at the distal-most portion of the middle section 56 relative to the front-pillar section exterior surface 38. Additionally, the middle section aperture 66 can define a substantially oblong, or ovaloid shape. The middle section aperture 66 is configured to receive, or otherwise accept, a connector, fastener, or other connective structure, provided by a vehicle component to couple the vehicle component to the hybrid bracket 10A via the triple attachment protrusion 52.

With continued reference to FIG. 4, the rear section 58 can form an outer rear section surface 68. The outer rear section surface 68 can be the distal-most surface of the rear section 58 relative to the front-pillar section exterior surface 38. The outer rear section surface 68 can be a substantially planar surface and can be positioned further from the front-pillar section exterior surface 38 then the outer middle section surface 64. A rear overhang 70 can outwardly extend from the outer rear section surface 68 towards the center plane 28 of the vehicle 14. Specifically, the rear overhang 70 can be aligned with and extend from a top edge 72 of the outer rear section surface 68, wherein the top edge 72 is the edge of the outer rear section surface 68 that is positioned closest to a top-most portion of the vehicle 14 when the hybrid bracket 10A is attached to the body 12. Further, the rear overhang 70 can extend across the top edge 72 such that a substantial majority of the outer rear section surface 68 is positioned inferior to the rear overhang 70. Additionally, a front wall 74 can outwardly extend from the outer rear section surface 68 towards the center plane 28 of the vehicle 14. Specifically, the front wall 74 can be aligned with and extend from a front edge 76 of the outer rear section surface 68, wherein the front edge 76 is the edge of the outer rear section surface 68 that is positioned closest to the front end 34 of the hybrid bracket 10A. Further, the front wall 74 can extend substantially orthogonal to the rear overhang 70 along a substantial majority of the front edge 76. Further, both the rear overhang 70 and the front wall 74 may be integrally formed with one another and with the outer rear section surface 68, such that the rear section 58, the rear overhang 70, and the front wall 74 are a single unitary body. Together, the outer rear section surface 68, the rear overhang 70, and the front wall 74 cooperate to define a reception space 78. The reception space 78 is configured to receive, or otherwise accept, a connector, fastener, or other connective structure, provided by a vehicle component to couple the vehicle component to the hybrid bracket 10A via the triple attachment protrusion 52.

Figure 9:
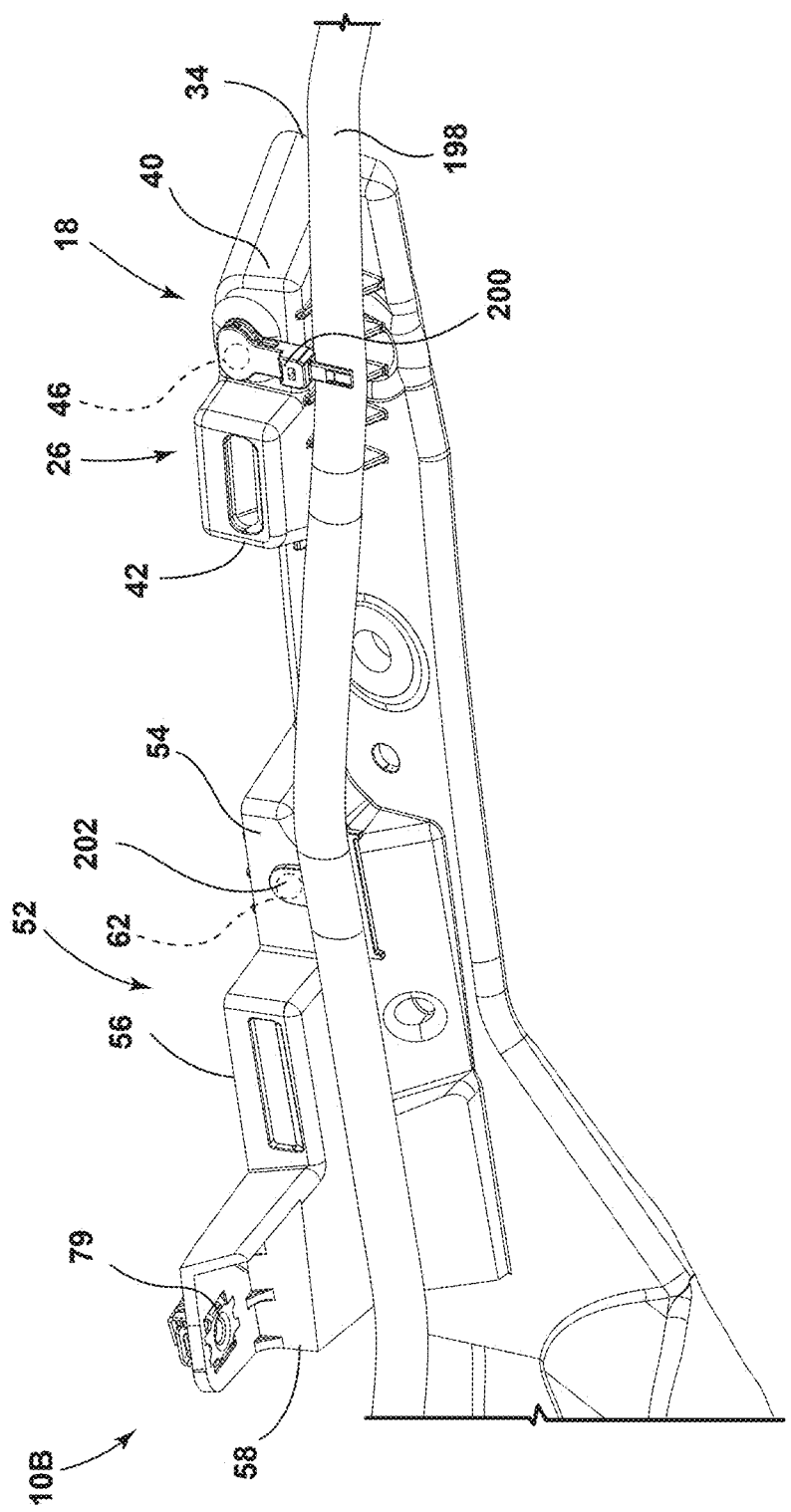
FIG. 9 is a bottom perspective view of the front-pillar section of the hybrid bracket coupled with a wire harness of the vehicle, wherein the hybrid bracket shown is configured to couple with the driver side of the body of the vehicle.

As best shown in FIGS. 4 and 9, an overhang aperture 79 can be defined by the rear overhang 70. The overhang aperture 79 can be configured to receive, or otherwise accept, a connector, fastener, or other connective structure, provided by a vehicle component to couple the vehicle component to the hybrid bracket 10A via the triple attachment protrusion 52.

With continued reference to FIG. 4, the triple attachment protrusion 52 can form an attachment plate 80. The attachment plate 80 can extend from the triple attachment protrusion 52 towards the front-pillar section exterior surface 38 and generally towards the bottom of the vehicle 14 to provide further stability and support to the triple attachment protrusion 52. The attachment plate 80 can be formed of a first plate portion 82 and a second plate portion 84. The first plate portion 82 extends from the front and middle sections 54, 56 of the triple attachment protrusion 52. The first plate portion 82 can extend at an oblique angle from the triple attachment protrusion 52, generally towards both the bottom of the vehicle 14 and towards the front-pillar section exterior surface 38 when the hybrid bracket 10A is attached to the body 12. The second plate portion 84 extends from the rear section 58 of the triple attachment protrusion 52. Additionally, the second plate portion 84 can extend at an oblique angle from the triple attachment protrusion 52 generally downwards, extending towards both the bottom of the vehicle 14 and towards the front-pillar section exterior surface 38 when the hybrid bracket 10A is attached with the body 12. The attachment plate 80 can be integrally formed with the triple attachment protrusion 52 and the front-pillar section exterior surface 38.

With reference back to FIG. 2, the hybrid bracket 10A can define a first insert aperture 90. Specifically, the first insert aperture 90 can be defined between the double attachment protrusion 26 and the triple attachment protrusion 52. The first insert aperture 90 can form a substantially hollow passage through the hybrid bracket 10A. A first insert 92 can be coupled with the hybrid bracket 10A. Specifically, the first insert 92 can be disposed within the first insert aperture 90, such that the first insert 92 is interposed between the double attachment protrusion 26 and the triple attachment protrusion 52. The first insert 92 can define a first contact aperture 94 that can be coaxially aligned with the first insert aperture 90, wherein the first contact aperture 94 forms a passage through the first insert 92. The first insert 92 can be formed of a metallic material, such that the first insert 92 can be substantially formed of metal. Consequently, the first insert 92 can be configured to receive, or otherwise accept, a connector, fastener, or other connective structure, provided by a vehicle component to couple the vehicle component to the hybrid bracket 10A via the front-pillar section 18. Specifically, the first insert 92 can be configured to facilitate the attachment of a vehicle component that benefits from a metal-to-metal interface. Moreover, the first insert 92 can be a metallic bearing or a bushing.

With continued reference to FIG. 2, the hybrid bracket 10A can define a pin aperture 93. Specifically, the pin aperture 93 can be defined between the double attachment protrusion 26 and the triple attachment protrusion 52. As such, the pin aperture 93 can be positioned adjacent to the first insert aperture 90 to form a passage through the hybrid bracket 10A. The pin aperture 93 can be configured to receive, or otherwise accept, a connector, fastener, or other connective structure, provided by a vehicle component to couple the vehicle component to the hybrid bracket 10A via the front-pillar section 18.

As shown in FIG. 2, the front-pillar section 18 can be integrally formed, such that the double attachment protrusion 26, the triple attachment protrusion 52, and the attachment plate 80, together, can define a single unitary body.

Figure 5:
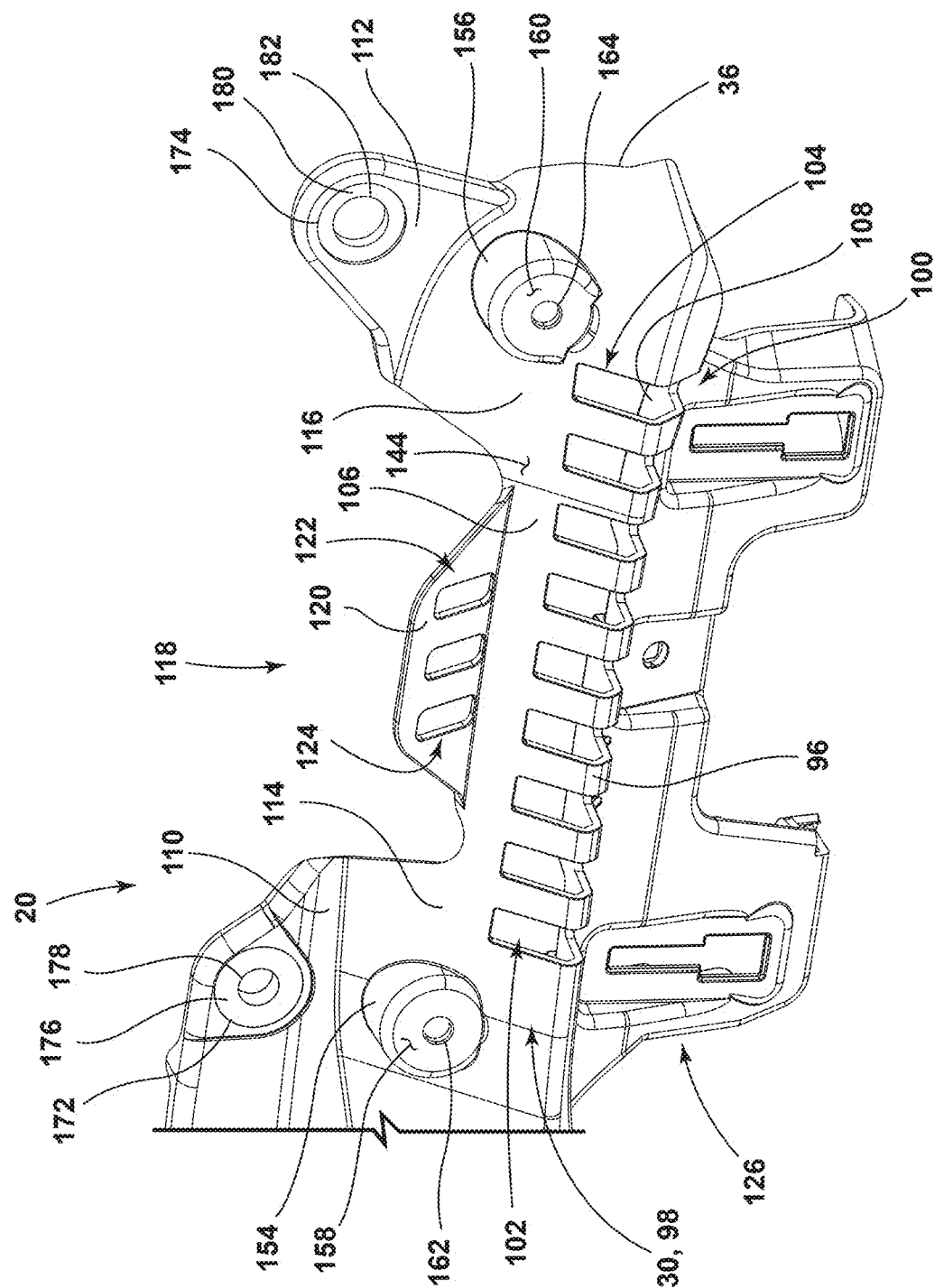
FIG. 5 is a top perspective view of a middle-pillar section of the hybrid bracket.
Figure 8:
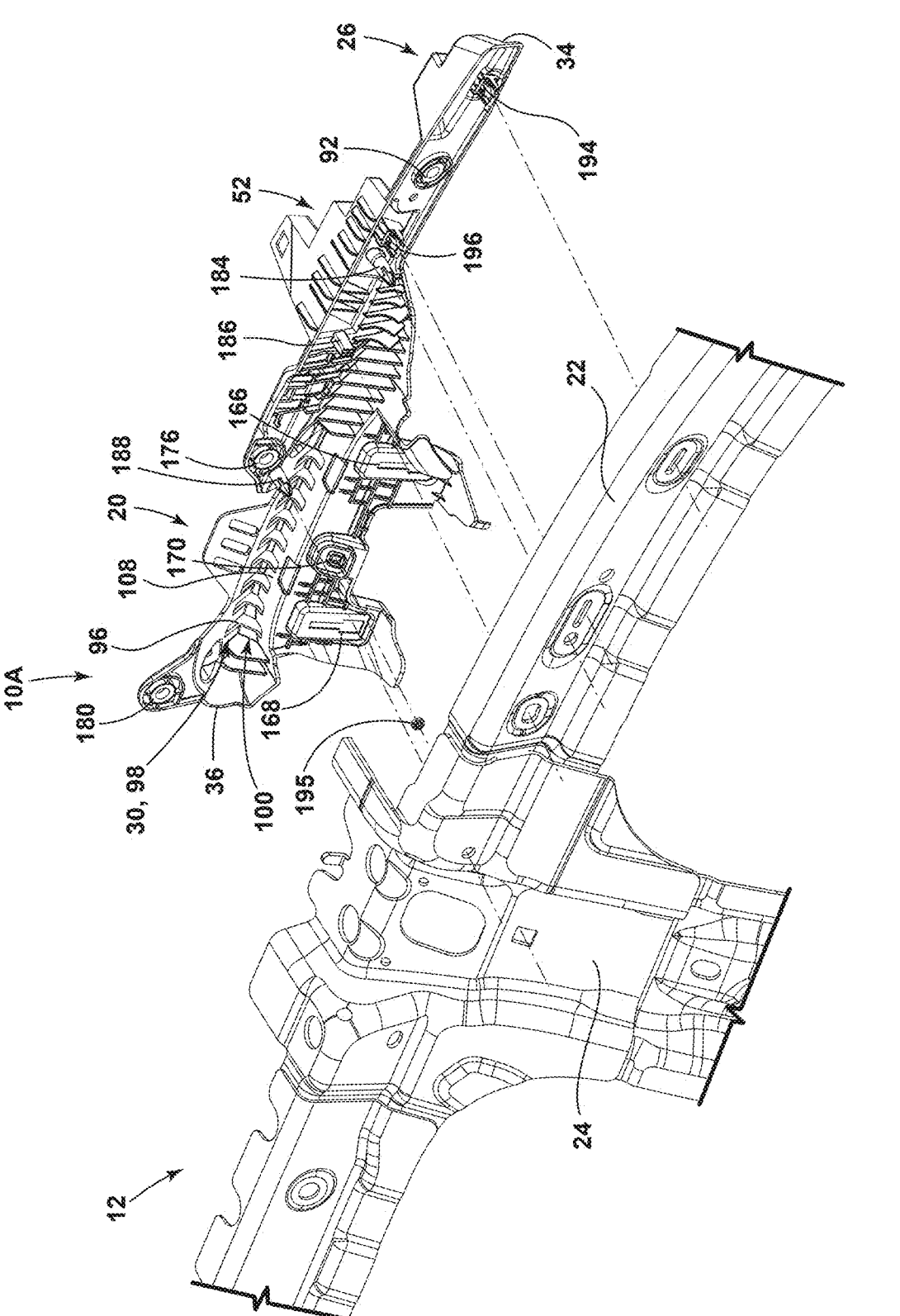
FIG. 8 is a top perspective, partially exploded view showing the attachment of the hybrid bracket to the passenger side of the body of the vehicle.

With reference now to FIG. 5, the middle-pillar section 20 is the portion of the hybrid bracket 10A configured to couple with, or otherwise attach to, the middle-pillar 24 of the body 12. Accordingly, the middle-pillar section 20 can be the portion of the hybrid bracket 10A that is proximate to the rear of the vehicle 14 when the hybrid bracket 10A is attached with the body 12 of the vehicle 14. The middle-pillar section 20 can additionally be formed such that the shape and dimensions of the middle-pillar section 20 align with or substantially conform to the middle-pillar 24, as best shown in FIG. 8. Consequently, the middle-pillar section 20 can be positioned substantially flush with the middle-pillar 24.

With continued reference to FIG. 5, the middle-pillar section 20 forms a generally oblong, or ovaloid shape, and extends along the longitudinal axis 16 of the vehicle 14 when the hybrid bracket 10A is attached to the body 12. Additionally, the middle-pillar section 20 generally forms a convex profile, defining a generally triangular cross-section, such that the middle-pillar section 20 can extend towards the center plane 28 of the vehicle 14 when the hybrid bracket 10A is attached to the body 12. Consequently, the middle-pillar section 20 can form an apex 96, wherein the apex 96 is the portion of the middle-pillar section 20 that is positioned closest to the center plane 28 of the vehicle 14 when the hybrid bracket 10A is attached to the body 12. As best shown in FIGS. 5 and 8, the middle-pillar section 20 can form a top ramp 98 and a bottom ramp 100. When the hybrid bracket 10A is attached to the body 12, the top ramp 98 upwardly extends from the apex 96 towards the body 12 and the bottom ramp 100 extends from the apex 96 generally downwards towards the body 12. An angle extending between the top and bottom ramps 98, 100 generally is oblique. Together, the apex 96, the top ramp 98, and the bottom ramp 100 cooperate to provide the middle-pillar section 20 with a convex profile.

The convex profile of the middle-pillar section 20 can define the air curtain ramp 30. The air curtain ramp 30 is configured to direct the deployment of the air curtain 32 (shown in FIGS. 9-10) when the hybrid bracket 10A is coupled with the body 12. Specifically, the top ramp 98 can function as the air curtain ramp 30. The top ramp 98 can facilitate the angled deployment of the air curtain 32, both downwards towards the bottom of the vehicle 14 and outwards towards the center plane 28 of the vehicle 14, as a function of the angled orientation of the top ramp 98 relative to the body 12 of the vehicle 14 and the apex 96 of the middle-pillar section 20.

With continued reference to FIG. 5, the middle-pillar section 20 forms a first series of ribs 102 interspaced by a first plurality of slots 104. Each of the first plurality of slots 104 can extend from an upper portion 106 of the top ramp 98 across the apex 96 to a lower portion 108 of the bottom ramp 100. Consequently, both the top and bottom ramps 98, 100 and the apex 96 of the middle-pillar section 20 can be divided into the first series of ribs 102 via the first plurality of slots 104. In other words, both the top and bottom ramps 98, 100 and the apex 96 can be formed by the first series of ribs 102. Generally, each of the first plurality of slots 104 extend across the height of the middle-pillar section 20 and are each substantially parallel to one another. As such, each of the first series of ribs 102 extend across the height of the middle-pillar section 20 and are each substantially parallel to one another. The first series of ribs 102 and the corresponding first plurality of slots 104 function to provide an energy absorptive capacity to the middle-pillar section 20 of the hybrid bracket 10A. Specifically, the first series of ribs 102 and the corresponding first plurality of slots 104 function to allow the top and bottom ramps 98, 100 and the apex 96 to deform under an exerted force. Accordingly, when a force is exerted against either the top ramp 98, the bottom ramp 100, and/or the apex 96, one or more of the first series of ribs 102 can deform, substantially absorbing and dispersing the exerted force.

As shown in FIG. 5, the top ramp 98 can operate in a hybrid capacity as both the air curtain ramp 30 and as an energy absorptive structure on account of the angled orientation of the top ramp 98 and the division of the top ramp 98 into the first series of ribs 102. Consequently, the air curtain ramp 30 can direct the deployment of the air curtain 32 and deform under an exerted force.

With continued reference to FIG. 5, the middle-pillar section 20 can form a front upper extension 110 and a rear upper extension 112. The front upper extension 110 can extend from a front region 114 of the upper portion 106 of the top ramp 98 towards the top of the vehicle 14 and substantially towards the front of the vehicle 14 when the hybrid bracket 10A is coupled with the body 12. The front region 114 of the top ramp 98 is the region of the top ramp 98 that is positioned closest to the front of the vehicle 14 when the hybrid bracket 10A is coupled with the body 12. The rear upper extension 112 can extend from a rear region 116 of the upper portion 106 of the top ramp 98 towards the top of the vehicle 14 and substantially towards the rear of the vehicle 14 when the hybrid bracket 10A is coupled with the body 12. The rear region 116 of the top ramp 98 is the region of the top ramp 98 that is positioned closest to the rear of the vehicle 14 when the hybrid bracket 10A is coupled with the body 12. As shown in FIG. 5, the front and rear upper extensions 110, 112 can extend away from one another, consequently, a first middle-section gap 118 can be formed between the front upper extension 110, the rear upper extension 112, and the upper portion 106 of the top ramp 98. When coupled with the body 12 of the vehicle 14, at least a portion of the middle-pillar 24 can be received within the first middle-pillar section gap 118. Consequently, the front and rear upper extensions 110, 112 can be positioned on opposite sides of the middle-pillar 24 when the hybrid bracket 10A is coupled with the body 12.

With continued reference to FIG. 5, the hybrid bracket 10A can form a middle-pillar section flange 120. The middle-pillar section flange 120 extends from the upper portion 106 of the top ramp 98 towards the top of the vehicle 14 and towards the center plane 28 of the vehicle 14 when the hybrid bracket 10A is attached to the body 12. As such, the middle-pillar section flange 120 can extend at an oblique angle relative to the top ramp 98. Additionally, the middle-pillar section flange 120 can form a second series of ribs 122 along with a corresponding second plurality of slots 124. When the hybrid bracket 10A is coupled with the body 12, the middle-pillar section flange 120 can cooperate with the air curtain ramp 30 to direct the deployment of the air curtain 32.

Figure 6:
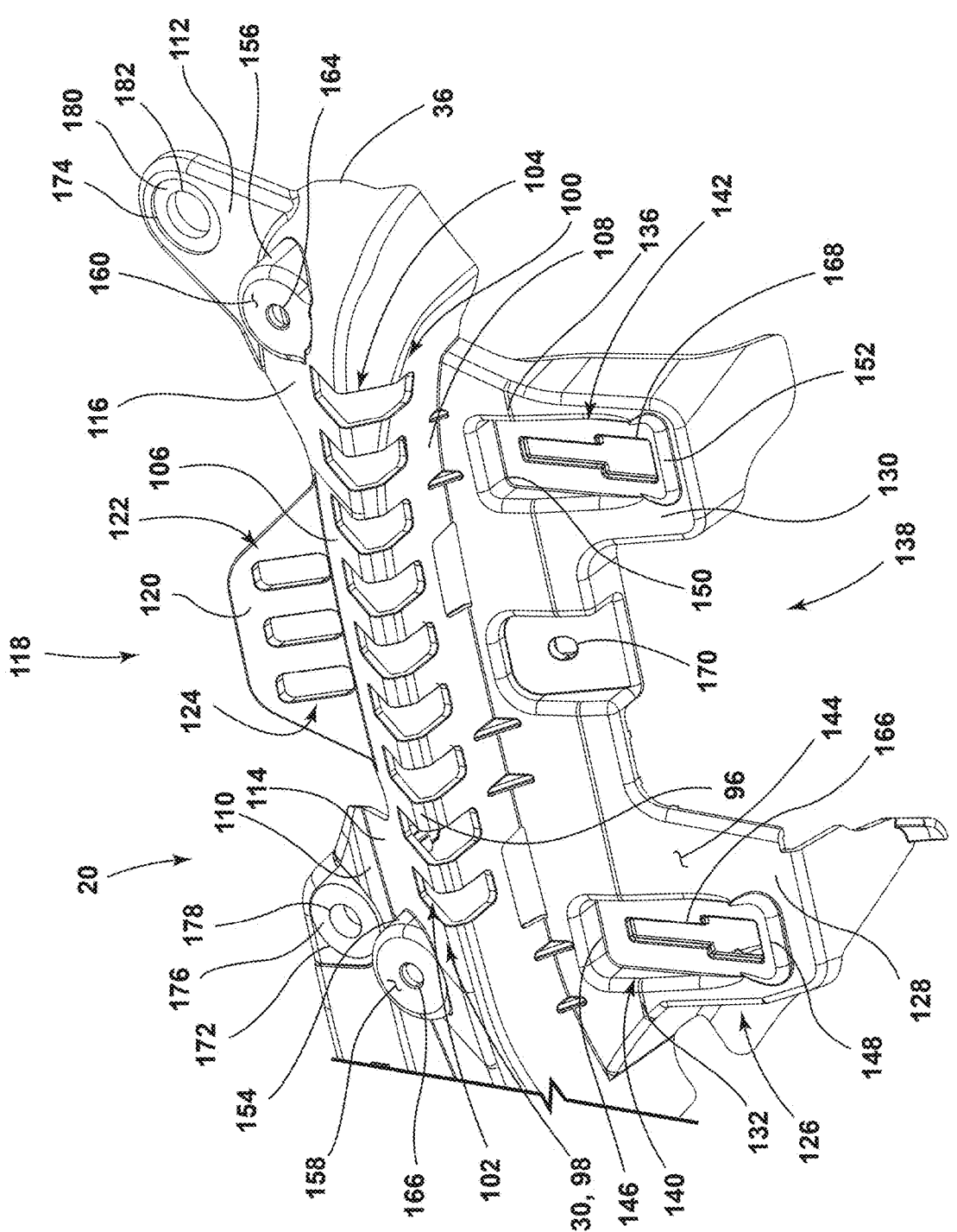
FIG. 6 is a bottom perspective view of the middle-pillar section of the hybrid bracket.

Referring now to FIG. 6, the hybrid bracket 10A can form a lower middle-section extension 126. The lower middle-section extension 126 can extend from the lower portion 108 of the bottom ramp 100 towards the bottom of the vehicle 14 and towards the body 12 of the vehicle 14 when the hybrid bracket 10A is attached to the body 12. Consequently, the lower middle-section extension 126 can extend at an oblique angle relative to the bottom ramp 100. Alternatively, the lower middle-section extension 126 can extend at a substantially orthogonal angle relative to the bottom ramp 100.

With continued reference to FIG. 6, the lower middle-section extension 126 can form a front lower extension 128 and a rear lower extension 130. The front lower extension 128 can extend from a front section 132 of the lower middle-section extension 126 towards the bottom of the vehicle 14 and towards the body 12 of the vehicle 14 when the hybrid bracket 10A is attached to the body 12. The front section 132 of the lower middle-section extension 126 is the section of the lower middle-section extension 126 that is positioned closest to the front of the vehicle 14 when the hybrid bracket 10A is coupled with the body 12. The rear lower extension 130 can extend from a rear section 136 of the lower middle-section extension 126 towards the bottom of the vehicle 14 and towards the body 12 of the vehicle when the hybrid bracket 10A is attached to the body 12. The rear section 136 of the lower middle-section extension 126 is the section of the lower middle-section extension 126 that is positioned closest to the rear of the vehicle 14 when the hybrid bracket 10A is coupled with the body 12. Consequently, the front lower extension 128 and the rear lower extension 130 can be longitudinally spaced apart from one another, such that a second middle-pillar section gap 138 is defined between the front and rear lower extensions 128, 130.

With continued reference to FIG. 6, the hybrid bracket 10A can form a first inset 140 and a second inset 142. The first inset 140 can form a substantially rectangular shape and can inwardly extend from a middle-pillar section exterior surface 144 of the lower middle-section extension 126. When the hybrid bracket 10A is attached to the body 12, the first inset 140 can generally extend inwards towards the body 12 of the vehicle 14. Further, the first inset 140 can extend from the front section 132 of the middle-pillar lower extension 126 to the front lower extension 128. Additionally, the first inset 140 can be oriented to extend substantially parallel to a height of the middle-pillar 24. Consequently, a first upper end 146 of the first inset 140 can be recessed within the front section 132 of the middle-pillar lower extension 126, such that the first upper end 146 is positioned closer to the body 12 of the vehicle 14 than the middle-pillar lower extension 126 when the hybrid bracket 10A is coupled with the body 12. Further, a first lower end 148 of the first inset 140 can extend outwards from the front lower extension 128, such that the first lower end 148 is positioned further from the body 12 of the vehicle 14 than the middle-pillar lower extension 126 when the hybrid bracket 10A is coupled with the body 12.

As shown in FIG. 6, the second inset 142 can form a substantially rectangular shape and can inwardly extend from the middle-pillar section exterior surface 144 of the lower middle-section extension 126. When the hybrid bracket 10A is attached to the body 12, the second inset 142 can generally extend inwards towards the body 12 of the vehicle 14. Further, the second inset 142 can extend from the rear section 136 of the middle-pillar lower extension 126 to the rear lower extension 130. Additionally, the second inset 142 can be oriented to extend substantially parallel to the height of the middle-pillar 24. Consequently, a second upper end 150 of the second inset 142 can be recessed within the rear section 136 of the middle-pillar lower extension 126, such that the second upper end 150 is positioned closer to the body 12 of the vehicle 14 than the middle-pillar lower extension 126 when the hybrid bracket 10A is coupled with the vehicle 14. Further, a second lower end 152 of the second inset 142 can extend outwards from the rear lower extension 130, such that the second lower end 152 is positioned further from the body 12 of the vehicle 14 than the middle-pillar lower extension 126 when the hybrid bracket 10A is coupled with the body 12.

With reference back to FIG. 5, the hybrid bracket 10A can form a first cylindrical attachment structure 154 and a second cylindrical attachment structure 156. Both the first and second cylindrical attachment structures 154, 156 are positioned at the middle-pillar section 20. Specifically, the first cylindrical attachment structure 154 is positioned adjacent to the front upper extension 110, and the second cylindrical attachment structure 156 is positioned adjacent to the rear upper extension 112. The first cylindrical attachment structure 154 forms a substantially cylindrical body that extends outwards from the middle-pillar section exterior surface 144. Further, the first cylindrical attachment structure 154 forms a first cylinder surface 158 at a distal-most portion of the first cylindrical attachment structure 154 relative to the middle-pillar section exterior surface 144. Likewise, the second cylindrical attachment structure 156 forms a substantially cylindrical body that extends outwards from the middle-pillar section exterior surface 144. Further, the second cylindrical attachment structure 156 forms a second cylinder surface 160 at a distal-most portion of the second cylindrical attachment structure 156 relative to the middle-pillar section exterior surface 144.

With continued reference to FIG. 5, the hybrid bracket 10A can define a first cylinder aperture 162 and a second cylinder aperture 164. The first cylinder aperture 162 can be defined by the first cylinder surface 158, defining a passage therethrough to a hollow interior defined by the first cylindrical attachment structure 154. The second cylinder aperture 164 can be defined by the second cylinder surface 160, defining a passage therethrough to a hollow interior defined by the second cylindrical attachment structure 156. Both the first and second cylinder apertures 162, 164 are configured to receive, or otherwise accept, a corresponding connector, fastener, or other connective structure, provided by a vehicle component to couple the vehicle component to the hybrid bracket 10A via the first and second cylindrical attachment structures 154, 156.

With reference back to FIG. 6, the hybrid bracket 10A can define a first inset aperture 166 and a second inset aperture 168. The first inset aperture 166 can be defined by the first inset 140, forming a passage therethrough. Additionally, the first inset aperture 166 can extend a substantial majority of a height of the first inset 140. The second inset aperture 168 can be defined by the second inset 142, forming a passage therethrough. Additionally, the second inset aperture 168 can extend a substantial majority of a height of the second inset 142. Both the first and second inset apertures 166, 168 are configured to receive, or otherwise accept, a corresponding connector, fastener, or other connective structure, provided by a vehicle component to couple the vehicle component to the hybrid bracket 10A via the first and second inset 140, 142.

With continued reference to FIG. 6, the hybrid bracket 10A can define a connection port 170. Specifically, the connection port 170 can be defined by the lower middle-section extension 126, forming a passage therethrough. The connection port 170 can be positioned between the front lower extension 128 and the rear lower extension 130. The connection port 170 can be configured to receive, or otherwise accept, a connector, fastener, or other connective structure, provided by a vehicle component to couple the vehicle component to the hybrid bracket 10A via the lower middle-section extension 126.

As shown in FIGS. 5 and 6, the hybrid bracket 10A can define a second insert aperture 172 and a third insert aperture 174. The second insert aperture 172 can be defined by the front upper extension 110 of the middle-pillar section 20. The second insert aperture 172 can form a substantially hollow passage through the hybrid bracket 10A. A second insert 176 can be coupled with the hybrid bracket 10A. Specifically, the second insert 176 can be disposed within the second insert aperture 172. The second insert 176 can define a second contact aperture 178 that can be coaxially aligned with the second insert aperture 172, wherein the second contact aperture 178 can define a passage through the second insert 176. The second insert 176 can be formed of a metallic material, such that the second insert 176 can be formed substantially of metal. Consequently, the second insert 176 can be configured to facilitate the attachment of a vehicle component to the hybrid bracket 10A that benefits from a metal-to-metal interface. Moreover, the second insert 176 can be a metallic bearing or a metallic bushing. The third insert aperture 174 can be defined by the rear upper extension 112 of the middle-pillar section 20. The third insert aperture 174 can form a substantially hollow passage through the hybrid bracket 10A. A third insert 180 can be disposed within the third insert aperture 174. The third insert 180 can define a third contact aperture 182 that can be coaxially aligned with the third insert aperture 174 and can define a passage through the third insert 180. The third insert 180 can be formed of a metallic material, such that the third insert 180 can be formed substantially of metal. Consequently, the third insert 180 can be configured to facilitate the attachment of a vehicle component to the hybrid bracket 10A that benefits from a metal-to-metal interface. Moreover, the third insert 180 can be a metallic bearing or a metallic bushing.

With continued reference to FIGS. 5 and 6, the middle-pillar section 20 can be integrally formed, such that the top ramp 98, the bottom ramp 100, the apex 96, the front upper extension 110, the rear upper extension 112, the middle-pillar section flange 120, the lower middle-section extension 126, the first and second insets 140, 142, and the first and second cylindrical attachment structures 154, 156, together, can define a single unitary body.

As shown in FIGS. 2, 5, and 6, the front-pillar section 18 and the middle-pillar section 20 can be integrally formed, such that the hybrid bracket 10A is formed of a single unitary body. Further, the hybrid bracket 10A can be formed via an injection molding process. Additionally, the hybrid bracket 10A can be formed via an insert molding process, wherein the hybrid bracket 10A is formed substantially of an overmold material, such as a polymeric material, and is coupled with the first, second, and third inserts 92, 176, 180 via the insert molding process. Such a manufacturing process allows the hybrid bracket 10A to be formed of a polymeric material that provides the hybrid bracket 10A the capacity to form the energy absorptive air curtain ramp 30, while simultaneously coupling the first, second, and third inserts 92, 176, 180 to the hybrid bracket 10A. Accordingly, the hybrid bracket 10A can provide the dual function of providing an energy absorptive structure and facilitating the installation of vehicle components that benefit from a metal-to-metal interface.

Figure 7:
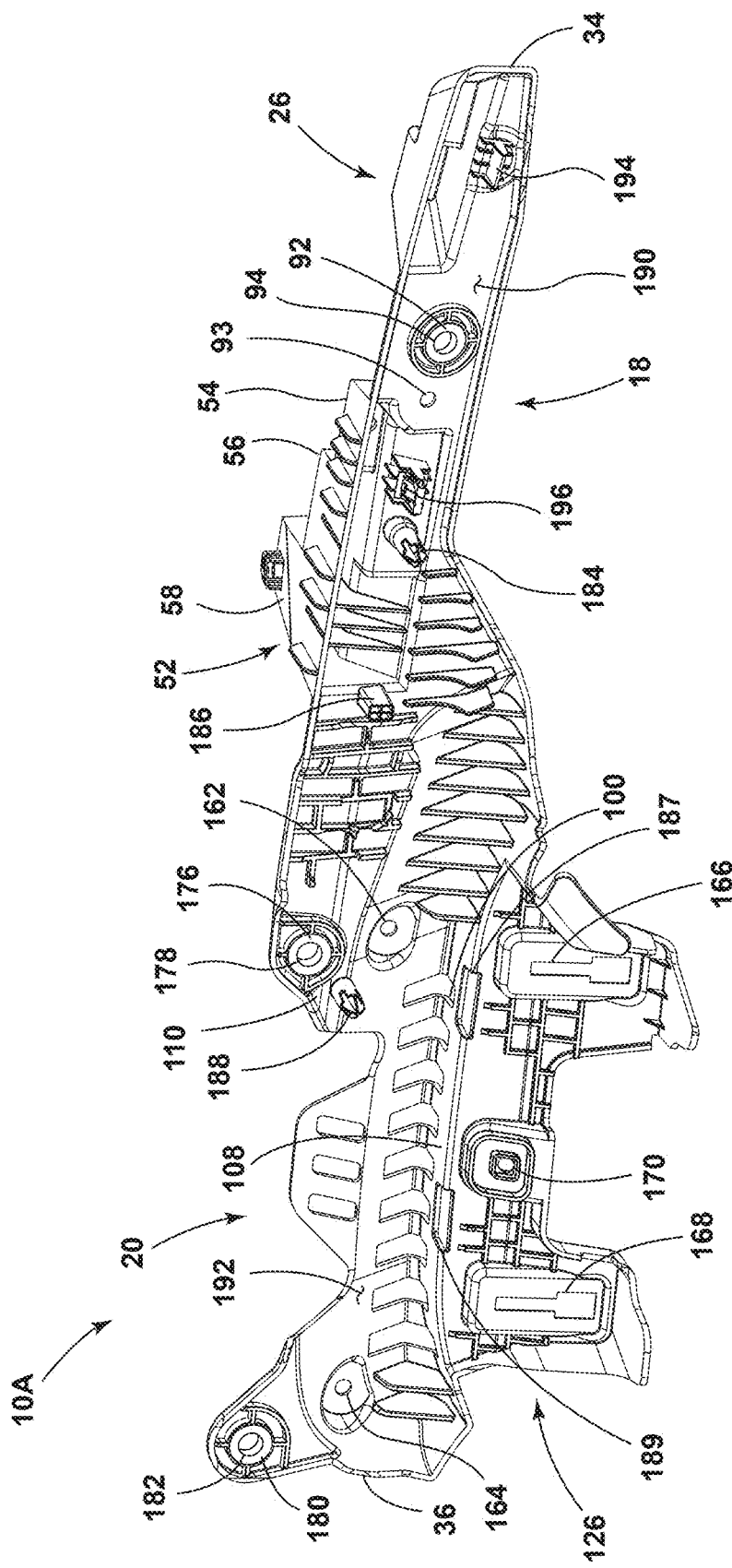
FIG. 7 is a top perspective view of a rear side of the hybrid bracket oriented to couple with the passenger side of the body of the vehicle.

With reference now to FIG. 7, the hybrid bracket 10A can form a first ramp aperture 187 and a second ramp aperture 189. Both the first and second ramp apertures 187, 189 can be formed by the bottom ramp 100, specifically, by the lower portion 108 of the bottom ramp 100. Both the first and second ramp apertures 187, 189 are oriented towards the bottom of the vehicle 14, such that the first and second ramp apertures 187, 189 generally face towards the bottom of the vehicle 14 when the hybrid bracket 10A is attached to the body 12. Additionally, the first and second ramp apertures 187, 189 are spaced apart from one another, with the first ramp aperture 187 positioned closer to the front end 34 and the second ramp aperture 189 positioned closer to the rear end 36. Both the first and second ramp apertures 187, 189 are configured to receive, or otherwise accept, a corresponding connector, fastener, or other connective structure, provided by a vehicle component to couple the vehicle component to the hybrid bracket 10A via the lower portion 108 of the bottom ramp 100.

With continued reference to FIG. 7, the hybrid bracket 10A can form a first alignment protrusion 184. The first alignment protrusion 184 can extend from a front-pillar section interior surface 190 towards the body 12 of the vehicle 14 when the hybrid bracket 10A is attached to the body 12. The front-pillar section interior surface 190 is the surface of the hybrid bracket 10A that is formed by the front-pillar section 18 and that is opposite the front-pillar section exterior surface 38. Moreover, the front-pillar section interior surface 190 faces towards the body 12 of the vehicle 14 when the hybrid bracket 10A is coupled with the body 12. The first alignment protrusion 184 forms a generally cylindrical shape that tapers to a point at a distal-most end of the first alignment protrusion 184 relative to the front-pillar section interior surface 190. Additionally, the first alignment protrusion 184 can be aligned with the triple attachment protrusion 52. As shown in FIG. 8, the first alignment protrusion 184 is configured to engage with a corresponding aperture formed by the front-pillar 22 to facilitate the attachment of the hybrid bracket 10A to the body 12 of the vehicle 14. Also, the first alignment protrusion 184 can be configured to direct the installation of the hybrid bracket 10A to the body 12 as a function of the extension of the first alignment protrusion 184 from the front-pillar section interior surface 190 and the tapered point formed by the first alignment protrusion 184.

With continued reference to FIG. 7, the hybrid bracket 10A can form a second alignment protrusion 186. The second alignment protrusion 186 can extend from the front-pillar section interior surface 190 towards the body 12 of the vehicle 14 when the hybrid bracket 10A is attached to the body 12. The second alignment protrusion 186 forms a substantially columnar shape and is aligned with the front-pillar section 18. Specifically, the second alignment protrusion 186 can be positioned further from the front end 34 of the hybrid bracket 10A than the first alignment protrusion 184. As shown in FIG. 8, the second alignment protrusion 186 is configured to engage with a corresponding aperture formed by the front-pillar 22 to facilitate the attachment of the hybrid bracket 10A to the body 12 of the vehicle 14. Also, the second alignment protrusion 186 can be configured to direct the installation of the hybrid bracket 10A to the body 12 as a function of the extension of the second alignment protrusion 186 from the front-pillar section interior surface 190.

With continued reference to FIG. 7, the hybrid bracket 10A can form a third alignment protrusion 188. The third alignment protrusion 188 can extend from a middle-pillar section interior surface 192 towards the body 12 of the vehicle 14 when the hybrid bracket 10A is attached to the body 12. The middle-pillar section interior surface 192 is the surface of the hybrid bracket 10A formed by the middle-pillar section 20 that is opposite the middle-pillar section exterior surface 144. Moreover, the middle-pillar section interior surface 192 faces towards the body 12 of the vehicle 14 when the hybrid bracket 10A is coupled with the body 12. The third alignment protrusion 188 forms a generally cylindrical shape that tapers to a point at a distal-most end of the third alignment protrusion 188 relative to the middle-pillar section interior surface 192. Additionally, the third alignment protrusion 188 can be aligned with the front upper extension 110 of the middle-pillar section 20. As shown in FIG. 8, the third alignment protrusion 188 is configured to engage with a corresponding aperture formed by the middle-pillar 24 to facilitate the attachment of the hybrid bracket 10A to the body 12 of the vehicle 14. Also, the third alignment protrusion 188 can be configured to direct the installation of the hybrid bracket 10A to the body 12 as a function of the extension of the third alignment protrusion 188 from the middle-pillar section interior surface 192 and the tapered point formed by the third alignment protrusion 188.

As shown in FIG. 7, the first, second, and third alignment protrusions 184, 186, 188 can be integrally formed with the hybrid bracket 10A.

With continued reference to FIG. 7, the hybrid bracket 10A can form a first attachment clip 194. The first attachment clip 194 can extend from the front-pillar section interior surface 190 towards the body 12 of the vehicle 14 when the hybrid bracket 10A is attached to the body 12. Additionally, the first attachment clip 194 can be aligned with the double attachment protrusion 26. As shown in FIG. 8, the first attachment clip 194 is configured to engage with a corresponding aperture formed by the front-pillar 22 to fix the hybrid bracket 10A to the body 12 of the vehicle 14. As such, the first attachment clip 194 can be configured to lock within or fixedly couple with the corresponding aperture to prevent the removal of the hybrid bracket 10A from the body 12 of the vehicle 14.

With continued reference to FIG. 7, the hybrid bracket 10A can form a second attachment clip 196. The second attachment clip 196 can extend from the front-pillar section interior surface 190 towards the body 12 of the vehicle 14 when the hybrid bracket 10A is attached to the body 12. Additionally, the second attachment clip 196 can be aligned with the triple attachment protrusion 52. The second attachment clip 196 is configured to engage with a corresponding aperture formed by the front-pillar 22 to fix the hybrid bracket 10A to the body 12 of the vehicle 14. As such, the second attachment clip 196 can be configured to lock within or fixedly couple with the corresponding aperture to prevent the removal of the hybrid bracket 10A from the body 12 of the vehicle 14.

With reference now to FIG. 8, the hybrid bracket 10A can be attached to the body 12 of the vehicle 14 through aligning the first, second, and third alignment protrusions 184, 186, 188 with the respective aperture formed by the body 12 of the vehicle 14. Once aligned, the hybrid bracket 10A can be engaged with the body 12 such that the alignment protrusions are received within the respective apertures and the first and second attachment clips 194, 196 are engaged and locked within the respective apertures. Additionally, a connection fastener 195 can be disposed through the connection port 170 and a corresponding aperture of the middle-pillar 24 to further install the hybrid bracket 10A to the body 12 of the vehicle 14.

With reference now to FIG. 9, a wire harness 198 of the vehicle 14 can be attached to the hybrid bracket 10B positioned at the driver side 15 of the vehicle 14. Specifically, a first harness retainer 200 can be attached to the fore section 40 of the double attachment protrusion 26 via the fore section aperture 46. A second harness retainer 202 can be attached to the front section 54 of the triple attachment protrusion 52 via the front section aperture 62. The wire harness 198 can be attached to the hybrid bracket 10B via both the first and second harness retainers 200, 202. Moreover, the wire harness 198 can be attached to the hybrid bracket 10B via the fore section 40 of the double attachment protrusion 26 and via the front section 54 of the triple attachment protrusion 52. Consequently, the wire harness 198 can be at least partially supported by both the double and triple attachment protrusions 26, 52.

Figure 10:
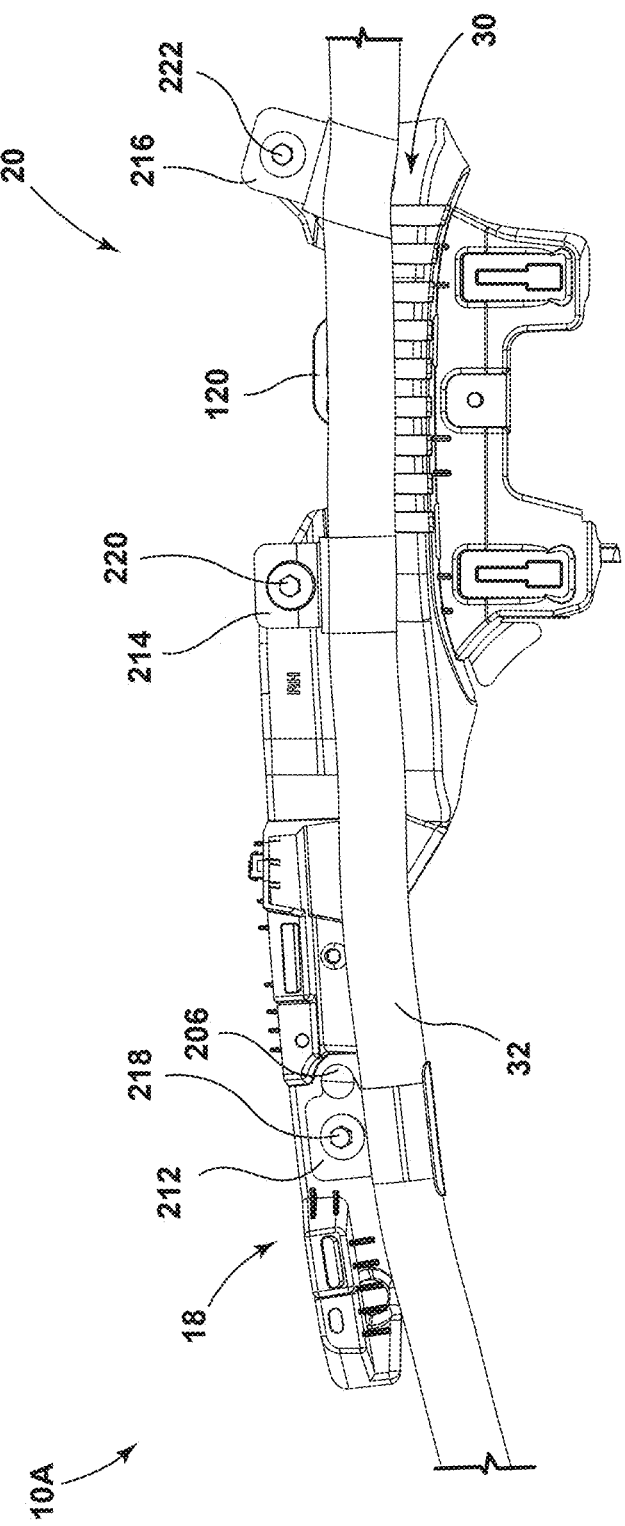
FIG. 10 is a side elevational view of the hybrid bracket coupled with an air curtain of the vehicle.
Figure 11:
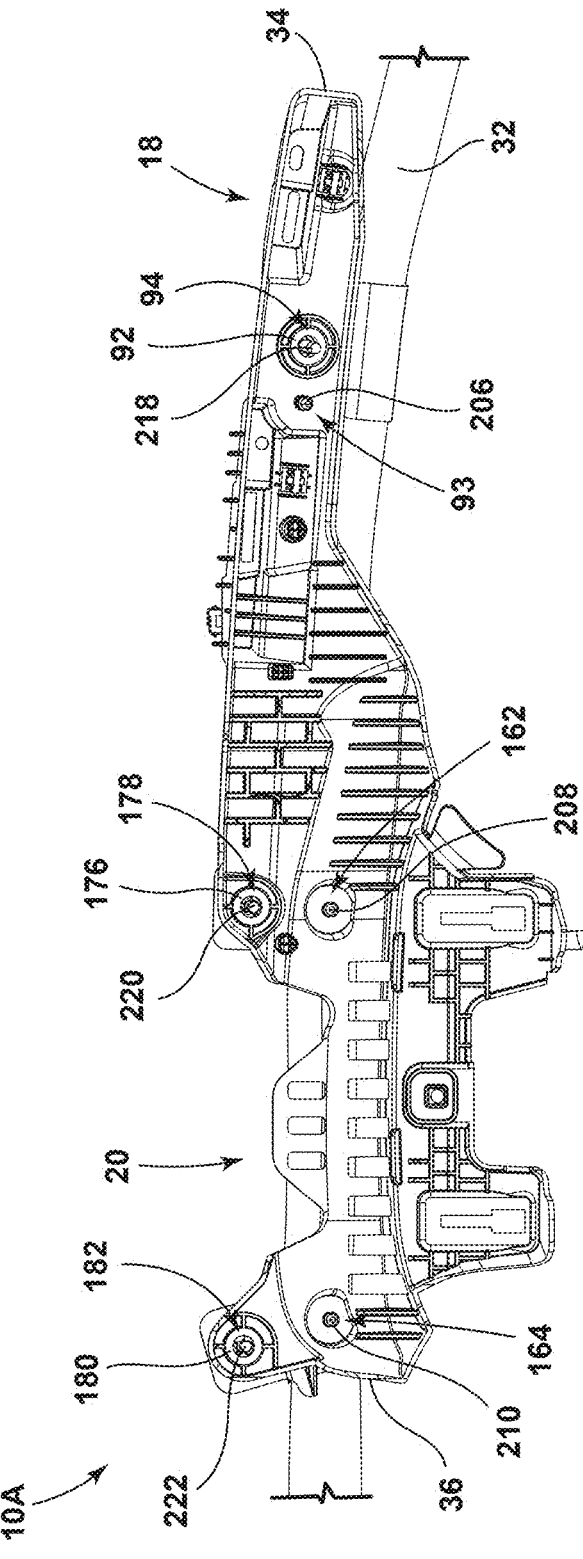
FIG. 11 is a side elevational view of the rear side of the hybrid bracket coupled with the air curtain of the vehicle.

With reference now to FIGS. 10-11 the air curtain 32 includes a canvas and an activation structure. The activation structure is configured to fill the canvas of the air curtain 32 with air to form an air-filled cushion that can extend over the height and the length of a side of the vehicle 14. In an inactivated state, the canvas and activation structure are stowed as a substantially tubular structure that can extend across the length of the hybrid bracket 10A as shown in FIG. 10-11. Further, the air curtain 32 can be attached to the hybrid bracket 10A. Specifically, the air curtain 32 can be at least partially attached to the hybrid bracket 10A via a first, second, and third pin 206, 208, 210, as shown in FIG. 11. The first pin 206 extends through a first strap 212 attached to the air curtain 32 and is disposed within the pin aperture 93. The second pin 208 extends through a second strap 214 attached to the air curtain 32 and is disposed within the first cylinder aperture 162. The third pin 210 extends through a third strap 216 attached to the air curtain 32 and is disposed within the second cylinder aperture 164. The first, second, and third pins 206, 208, 210 function to ensure the proper alignment of the air curtain 32 with the hybrid bracket 10A, thereby facilitating the installation of the air curtain 32.

With continued reference to FIGS. 10 and 11, the air curtain 32 can be attached to the hybrid bracket 10A via a first, second, and third fastener 218, 220, 222. The first fastener 218 extends through the first strap 212 and is disposed within the first contact aperture 94, such that the first fastener 218 is engaged with the first insert 92. The second fastener 220 extends through the second strap 214 and is disposed within the second contact aperture 178, such that the second fastener 220 is engaged with the second insert 176. The third fastener 222 extends through the third strap 216 and is disposed within the third contact aperture 182, such that the third fastener 222 is engaged with the third insert 180. Both the first, second, and third fasteners 218, 220, 222 can be formed of a metallic material, such that each of the first, second, and third fasteners 218, 220, 222 can each be formed substantially of metal. Consequently, when the first, second, and third fasteners 218, 220, 222 are engaged with the corresponding insert 92, 176, 180, a metal-to-metal interface is created. Accordingly, the air curtain 32 is attached to the hybrid bracket 10A via a series of metal-to-metal interfaces, benefiting the operation of the air curtain 32. In sum, the first insert 92, the second insert 176, and the third insert 180, at least partially, facilitate the attachment of the air curtain 32 to the hybrid bracket 10A.

As shown in FIG. 10, when installed to the hybrid bracket 10A, at least a portion of the air curtain 32 can be positioned atop the air curtain ramp 30 and adjacent to the middle-pillar section flange 120.

Figure 12:
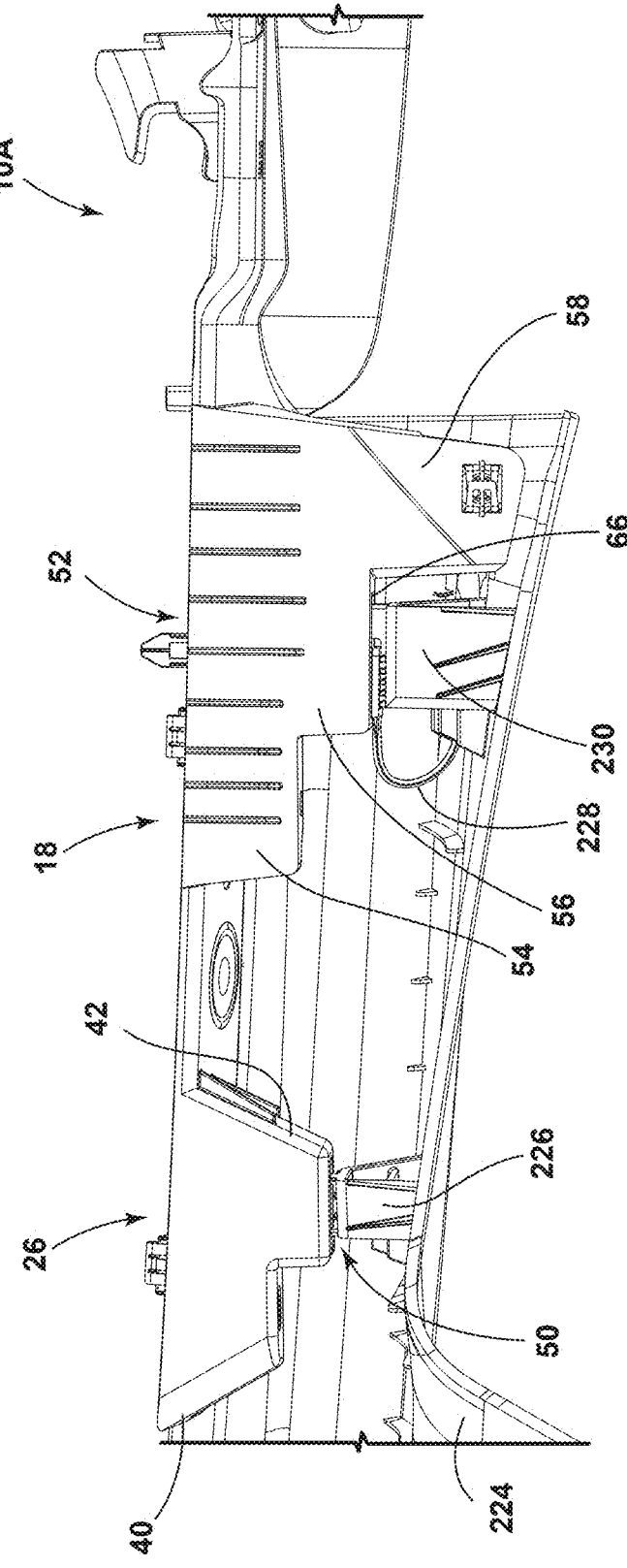
FIG. 12 is a top elevational view of the front-pillar section of the hybrid bracket coupled with a front-pillar trim piece of the vehicle.

With reference now to FIG. 12, a front-pillar trim piece 224 is configured to couple with the hybrid bracket 10A via the front-pillar section 18. Specifically, a first front-pillar trim fastener 226 provided by the front-pillar trim piece 224 can engage with the aft section aperture 50 to facilitate the attachment of the front-pillar trim piece 224 to the hybrid bracket 10A via the aft section 42 of the double attachment protrusion 26. Generally, the first front-pillar trim fastener 226 can be a clip that is fixedly disposed within the aft section aperture 50 to at least partially attach the front-pillar trim piece 224 to the hybrid bracket 10A. Additionally, a second front-pillar trim fastener 228 provided by the front-pillar trim piece 224 can engage with the middle section aperture 66 to facilitate the attachment of the front-pillar trim piece 224 to the hybrid bracket 10A via the middle section 56 of the triple attachment protrusion 52. Generally, the second front-pillar trim fastener 228 can be a tether clip that generally interacts with the middle section aperture 66 and the middle section 56 to, at least partially, attach the front-pillar trim piece 224 to the hybrid bracket 10A. Also, a third front-pillar trim fastener 230 provided by the front-pillar trim piece 224 can engage with the middle section aperture 66 to facilitate the attachment of the front-pillar trim piece 224 to the hybrid bracket 10A via the middle section 56. Generally, the third front-pillar trim fastener 230 can be a protrusion that extends from the front-pillar trim piece 224 towards the hybrid bracket 10A and functions as a locator to aid in the installation of the front-pillar trim piece 224 to the hybrid bracket 10A. The third front-pillar trim fastener 230 can be disposed within the middle section aperture 66 to, at least partially, attach the front-pillar trim piece 224 to the hybrid bracket 10A.

Figure 13:
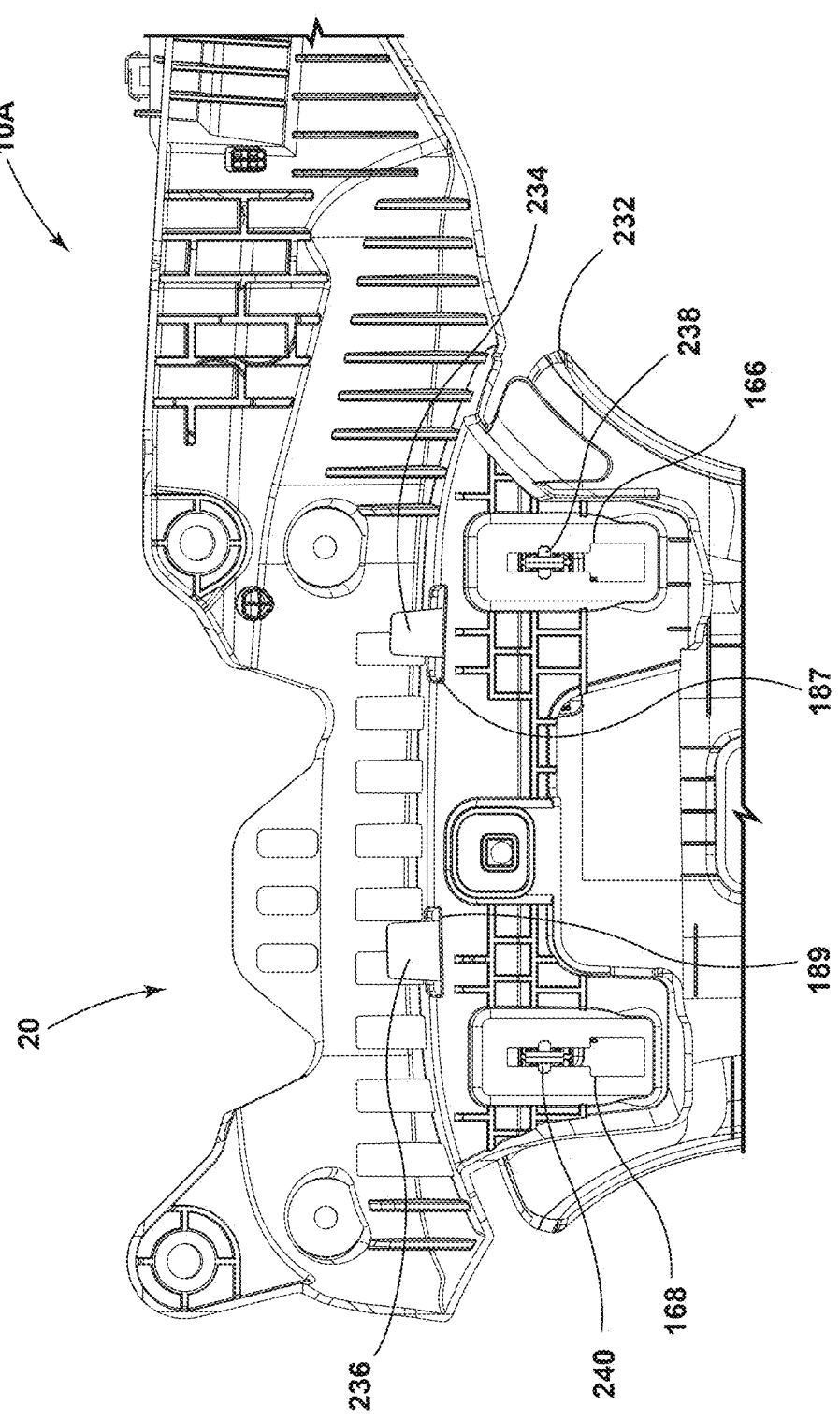
FIG. 13 is a side elevational view of the rear side of the middle-pillar section of the hybrid bracket coupled with a middle-pillar trim piece of the vehicle.

With reference now to FIG. 13, a middle-pillar trim piece 232 is configured to couple with the hybrid bracket 10A via the middle-pillar section 20. The middle-pillar trim piece 232 can provide a first and second middle-pillar prong 234, 236 that extend from the middle-pillar trim piece 232 upwards towards the top of the vehicle 14. The first and second middle-pillar prongs 234, 236 are configured to engage with the first and second ramp apertures 187, 189, respectively, to facilitate the attachment of the middle-pillar trim piece 232 to the hybrid bracket 10A. Generally, the first and second middle-pillar prongs 234, 236 can function as locators, assisting in the alignment of the middle-pillar trim piece 232 with the hybrid bracket 10A. Additionally, the middle-pillar trim piece 232 provides a first middle-pillar trim fastener 238 and a second middle-pillar trim fastener 240. The first and second middle-pillar trim fasteners 238, 240 are configured to engage with the first and second inset apertures 166, 168, respectively, to facilitate the attachment of the middle-pillar trim piece 232 to the hybrid bracket 10A. Generally, the first and second middle-pillar trim fasteners 238, 240 can be disposed within and engaged with the respective inset aperture 166, 168 to install the middle-pillar trim piece 232 to the hybrid bracket 10A.

Figure 14:
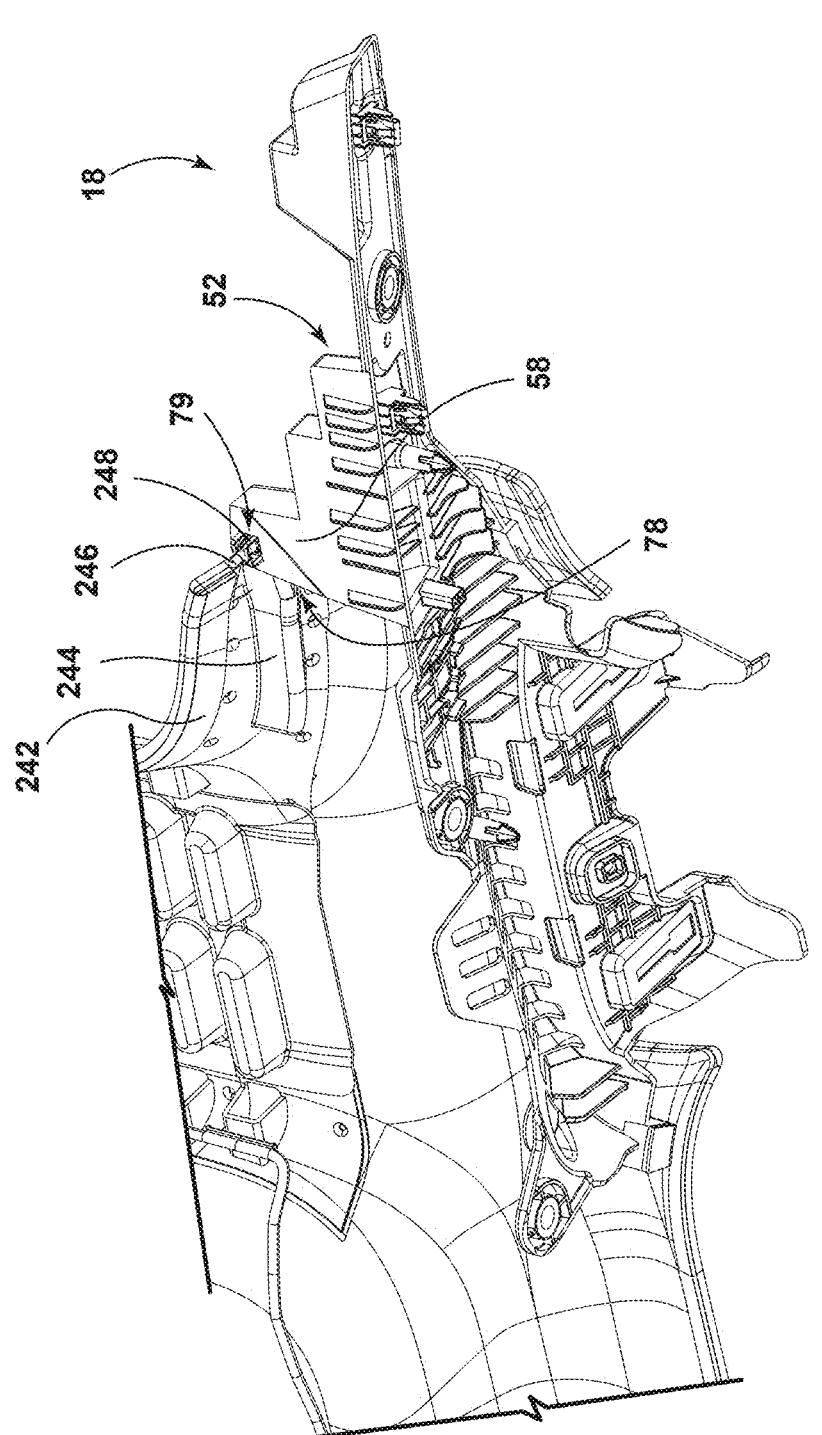
FIG. 14 is a top perspective view of the hybrid bracket coupled with a headliner of the vehicle.
Figure 15:
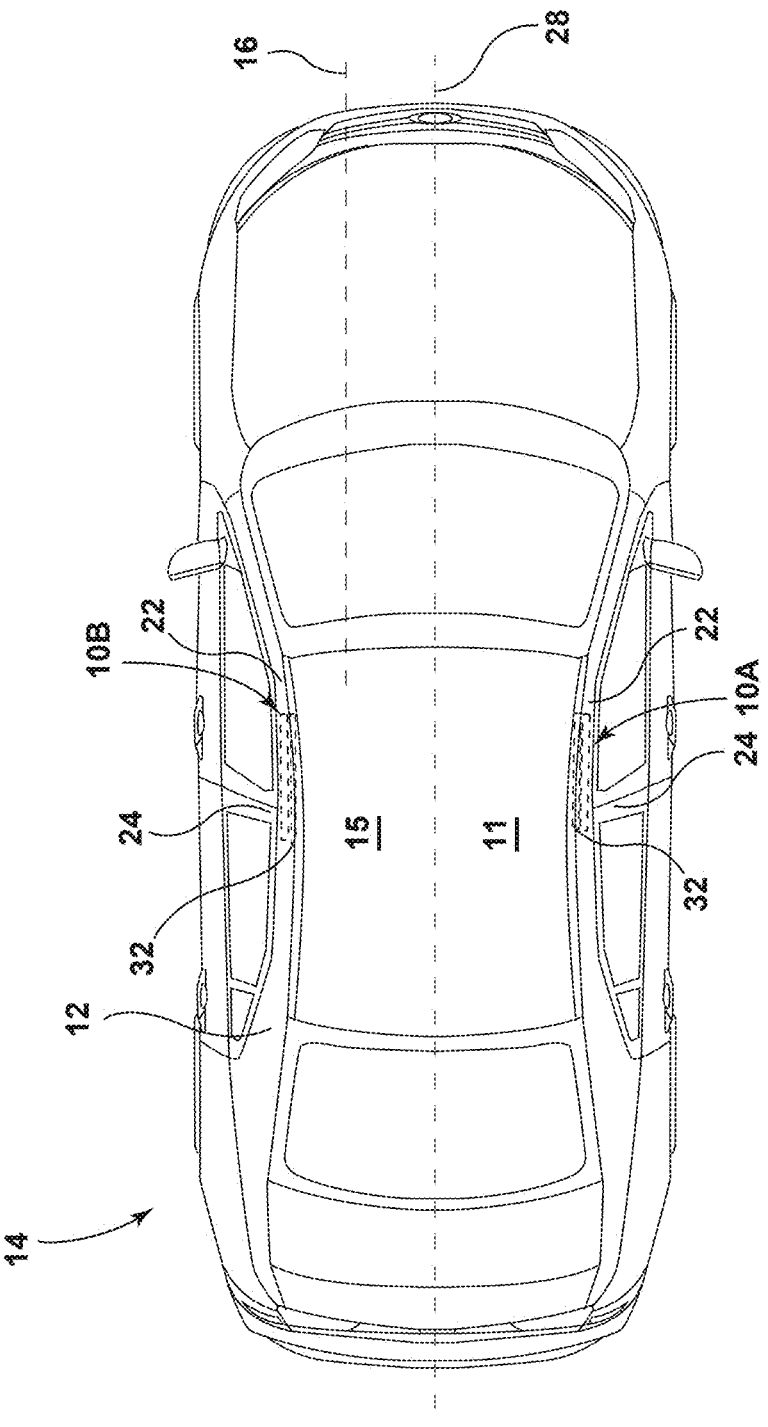
FIG. 15 is a schematic of the vehicle showing a hybrid bracket coupled with a passenger side of the body of the vehicle, and a hybrid bracket coupled with a driver side of the body of the vehicle.

With reference now to FIG. 14, a headliner 242 of the vehicle 14 is configured to couple with the hybrid bracket 10A via the front-pillar section 18. The headliner 242 can form a headliner extension 244 that can be received within the reception space 78 formed by the rear section 58 of the triple attachment protrusion 52. A headliner fastener 246 can be engaged with the headliner extension 244 and disposed within the overhang aperture 79 to facilitate the installation of the headliner 242 to the hybrid bracket 10A. Further, a headliner clip 248 can be attached with the headliner fastener 246 to further facilitate the installation of the headliner 242 to the hybrid bracket 10A. Generally, the headliner fastener 246 can be a screw and the headliner clip 248 can be a J-nut configured to engage with the headliner fastener 246 to secure the headliner fastener 246, and thereby the headliner 242 to the hybrid bracket 10A.

With reference now to FIG. 15, one or more hybrid brackets 10A, 10B can be installed within the vehicle 14. Specifically, as shown in FIG. 14, the hybrid bracket 10A can be installed at the passenger side 11 of the vehicle 14, and the hybrid bracket 10B can be installed at the driver side 15 of the vehicle 14.

Use of the present concept may provide a variety of advantages. First, the use of a hybrid bracket 10A, 10B that can be a single unitary body capable of attaching to both the front and middle-pillar 22, 24 reduces part count and increases the efficiency of the manufacturing process. Further, the use of a single bracket reduces the space needed to install the bracket, allowing for a larger top window, or "sky garden" to be installed. Additionally, attaching the front-pillar trim piece 224, the middle-pillar trim piece 232, and the headliner 242 to the hybrid bracket 10A, 10B reduces variation in the appearance and form of the trim visible to the user, thereby enhancing the aesthetics and perceived quality of the vehicle 14. Also, the use of an injection molded process or an insert molding process to form the hybrid bracket 10A, 10B while coupling the inserts 92, 176, 180 to the hybrid bracket 10A, 10B allows the hybrid bracket 10A, 10B to be formed of two dissimilar materials, each with unique material properties. Specifically, because the hybrid bracket 10A, 10B is substantially formed of a polymeric material, an energy absorptive capacity can be provided by the hybrid bracket 10A, 10B. The use of metal to form the inserts 92, 176, 180 allows the hybrid bracket 10A, 10B to facilitate a metal-to-metal interface between the hybrid bracket 10A, 10B and the air curtain 32.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A hybrid bracket for a vehicle, comprising:
a front-pillar section configured to couple with a front-pillar of the vehicle; and
a middle-pillar section that extends from the front-pillar section and that is configured to couple with a middle-pillar of the vehicle, wherein the middle-pillar section has a substantially convex shape and forms an air curtain ramp configured to direct deployment of an air curtain coupled with the hybrid bracket, and wherein the middle-pillar section is configured to extend towards a center plane of the vehicle when the hybrid bracket is coupled to the vehicle, wherein the air curtain ramp is formed of a series of ribs interspaced by a plurality of slots.

2. The hybrid bracket of claim 1, wherein the air curtain ramp is configured to deform under an exerted force.

3. The hybrid bracket of claim 1, wherein the air curtain ramp is configured to align with the middle-pillar of the vehicle.

4. The hybrid bracket of claim 1, wherein the front-pillar section of the hybrid bracket forms:
a double attachment protrusion that extends towards the center plane of the vehicle when the hybrid bracket is coupled with the vehicle; and
a triple attachment protrusion that extends towards the center plane of the vehicle when the hybrid bracket is coupled with the vehicle.

5. The hybrid bracket of claim 4, wherein the double attachment protrusion comprises:
a fore section that extends towards the center plane of the vehicle for a first distance when the hybrid bracket is coupled with the vehicle; and
an aft section that extends towards the center plane of the vehicle for a second distance when the hybrid bracket is coupled with the vehicle, wherein the second distance is greater than the first distance.

6. The hybrid bracket of claim 5, wherein the aft section of the double attachment protrusion is configured to couple with a front-pillar trim piece.

7. The hybrid bracket of claim 4, wherein the triple attachment protrusion comprises:
a front section that extends towards the center plane of the vehicle for a third distance when the hybrid bracket is coupled with the vehicle;
a middle section that extends toward the center plane of the vehicle for a fourth distance when the hybrid bracket is coupled with the vehicle; and
a rear section that extends towards the center plane of the vehicle for a fifth distance when the hybrid bracket is coupled with the vehicle, wherein the fifth distance is greater than the fourth distance, and wherein the fourth distance is greater than the third distance.

8. The hybrid bracket of claim 7, wherein the rear section of the triple attachment protrusion is configured to couple with a headliner of the vehicle.

9. The hybrid bracket of claim 4, wherein the double attachment protrusion and the triple attachment protrusion are configured to at least partially support a wire harness of the vehicle.

10. The hybrid bracket of claim 1, wherein the hybrid bracket is formed substantially of a polymeric material.

11. The hybrid bracket of claim 10, wherein the hybrid bracket further comprises:
a plurality of inserts that are each formed substantially of metal, wherein the plurality of inserts facilitates attachment of the air curtain to the hybrid bracket.

12. A hybrid bracket for a vehicle, comprising:
a front-pillar section configured to couple with a front-pillar of the vehicle;
a middle-pillar section that extends from the front-pillar section, wherein the middle-pillar section is configured to couple with a middle-pillar of the vehicle; and
a plurality of inserts that are each formed substantially of metal, wherein the plurality of inserts facilitate attachment of an air curtain to the hybrid bracket.

13. The hybrid bracket of claim 12, wherein the front-pillar section and the middle-pillar section are each formed substantially of a polymeric material.

14. The hybrid bracket of claim 13, wherein the hybrid bracket is formed via an insert molding process.

15. The hybrid bracket of claim 12, wherein the plurality of inserts comprises:

a first insert coupled with the front-pillar section;

a second insert coupled with the middle-pillar section; and a third insert coupled with the middle-pillar section.

16. The hybrid bracket of claim 15, wherein the hybrid bracket further comprises:

a double attachment protrusion that extends from the front-pillar section towards a center plane of the vehicle when the hybrid bracket is coupled with the vehicle; and a triple attachment protrusion that extends from the front-pillar section towards the center plane of the vehicle when the hybrid bracket is coupled with the vehicle;

wherein the first insert is interposed between the double attachment protrusion and the triple attachment protrusion.

17. The hybrid bracket for a vehicle of claim 12, wherein the front-pillar section is further configured to couple with a headliner of the vehicle.

18. The hybrid bracket for a vehicle of claim 12, wherein the hybrid bracket is configured to couple to a wire harness of the vehicle.

19. A vehicle, comprising:

a hybrid bracket coupled with the vehicle, wherein the hybrid bracket comprises:

a front-pillar section coupled with a front-pillar of the vehicle;

a middle-pillar section that extends from the front-pillar section and that is coupled with a middle-pillar of the vehicle, wherein the middle-pillar section has a substantially convex shape and forms an air curtain ramp configured to direct deployment of an air curtain coupled with the hybrid bracket, and wherein the middle-pillar section extends towards a center plane of the vehicle; and a plurality of inserts that are each formed substantially of metal, wherein the air curtain is coupled to the plurality of inserts.

20. The vehicle of claim 19, wherein the plurality of inserts comprises:

a first insert coupled with the front-pillar section;

a second insert coupled with the middle-pillar section; and a third insert coupled with the middle-pillar section, wherein the air curtain ramp is interposed between the second insert and the third insert.

\* \* \* \* \*